(12) United States Patent
Dinoev et al.

(10) Patent No.: US 11,823,003 B2
(45) Date of Patent: Nov. 21, 2023

(54) METHOD FOR AUTHENTICATING A MAGNETICALLY INDUCED MARK WITH A PORTABLE DEVICE

(71) Applicant: SICPA HOLDING SA, Prilly (CH)

(72) Inventors: Todor Dinoev, Chavannes-près-Renens (CH); Jean-Luc Dorier, Bussigny (CH); Edmund Halasz, Orbe (CH); Evgeny Loginov, Renens (CH); Claude-Alain Despland, Prilly (CH); Andrea Callegari, Chavannes-près-Renens (CH)

(73) Assignee: SICPA HOLDING SA, Prilly (CH)

( * ) Notice: Subject to any disclaimer, the term of this patent is extended or adjusted under 35 U.S.C. 154(b) by 142 days.

(21) Appl. No.: 17/434,704

(22) PCT Filed: Feb. 10, 2020

(86) PCT No.: PCT/EP2020/053331
§ 371 (c)(1),
(2) Date: Aug. 27, 2021

(87) PCT Pub. No.: WO2020/173693
PCT Pub. Date: Sep. 3, 2020

(65) Prior Publication Data
US 2022/0171953 A1   Jun. 2, 2022

(30) Foreign Application Priority Data
Feb. 28, 2019   (EP) .................................. 19160146

(51) Int. Cl.
*G06K 7/14*    (2006.01)
*G07D 7/12*    (2016.01)
*B42D 25/369*  (2014.01)

(52) U.S. Cl.
CPC .......... *G06K 7/1417* (2013.01); *G06K 7/1413* (2013.01); *G07D 7/12* (2013.01); *B42D 25/369* (2014.10); *G07D 2207/00* (2013.01)

(58) Field of Classification Search
CPC ...... G06K 7/1417; G06K 7/1413; G07D 7/12; G07D 2007/00; B24D 25/369
See application file for complete search history.

(56) References Cited

U.S. PATENT DOCUMENTS

| 2,418,479 A | 4/1947 | Pratt et al. |
| 2,570,856 A | 10/1951 | Pratt et al. |

(Continued)

FOREIGN PATENT DOCUMENTS

| CA | 2161816 | 5/1996 |
| CN | 105453145 | 3/2016 |

(Continued)

OTHER PUBLICATIONS

Printing Technology, J. M. Adams and P. A. Dolin, Delmar Thomson Learning, 5th Edition, 2002, p. 293, 332, and 352.

(Continued)

*Primary Examiner* — Matthew Mikels
(74) *Attorney, Agent, or Firm* — Muncy, Geissler, Olds & Lowe, P.C.

(57) ABSTRACT

The invention relates to a method of authenticating a magnetically induced mark applied on a substrate including magnetically oriented partially reflective platelet-shaped magnetic or magnetizable pigment particles, with a portable device equipped with a light source operable to deliver visible light, an imager, a processor and a memory, the method comprising calculating, with the processor, a corresponding average intensity I of the light reflected by the partially reflective platelet-shaped magnetic or magnetizable pigment particles and collected by the imager at correspond- (Continued)

ing viewing angle θ, storing the calculated average intensities of the reflected light and corresponding viewing angles to obtain a reflected light intensity curve $I(\theta)$, comparing the stored reflected light intensity curve $I(\theta)$ with a stored reference reflected light intensity curve $I_{ref}(\theta)$ for said magnetically induced mark, and determining whether the magnetically induced mark is genuine based on a result of the comparison.

7 Claims, 13 Drawing Sheets

(56) References Cited

U.S. PATENT DOCUMENTS

| | | | |
|---|---|---|---|
| 3,676,273 | A | 7/1972 | Graves |
| 3,791,864 | A | 2/1974 | Steingroever |
| 4,838,648 | A | 6/1989 | Phillips et al. |
| 5,364,689 | A | 11/1994 | Kashiwagi et al. |
| 5,630,877 | A | 5/1997 | Kashiwagi et al. |
| 6,103,361 | A | 8/2000 | Batzar et al. |
| 6,759,097 | B2 | 7/2004 | Phillips et al. |
| 6,838,166 | B2 | 1/2005 | Phillips et al. |
| 8,025,952 | B2 | 9/2011 | Raksha et al. |
| 8,343,615 | B2 | 1/2013 | Raksha et al. |
| 10,140,494 | B1 | 11/2018 | Lawandy |
| 2002/0105654 | A1 | 8/2002 | Goltsos |
| 2002/0160194 | A1 | 10/2002 | Phillips et al. |
| 2003/0170471 | A1 | 9/2003 | Seto et al. |
| 2004/0009309 | A1 | 1/2004 | Raksha et al. |
| 2004/0051297 | A1 | 3/2004 | Raksha et al. |
| 2004/0112962 | A1* | 6/2004 | Farrall .......... G07D 7/2033 235/462.01 |
| 2007/0273143 | A1 | 11/2007 | Crane et al. |
| 2011/0190920 | A1 | 8/2011 | Mercolino |
| 2011/0298207 | A1 | 12/2011 | Despland et al. |
| 2013/0084411 | A1 | 4/2013 | Raksha et al. |
| 2014/0224879 | A1 | 8/2014 | Guigan |
| 2016/0176223 | A1 | 6/2016 | Degott et al. |
| 2016/0203665 | A1 | 7/2016 | Kulikovsky et al. |
| 2016/0253857 | A1* | 9/2016 | Heusch .......... H04N 7/185 382/137 |
| 2016/0378061 | A1 | 12/2016 | Reinhardt |
| 2017/0242263 | A1 | 8/2017 | Raymond et al. |

FOREIGN PATENT DOCUMENTS

| | | |
|---|---|---|
| CN | 108921217 | 11/2018 |
| DE | 2006848 | 9/1971 |
| EP | 0406667 | 1/1995 |
| EP | 0710508 | 5/1996 |
| EP | 0686675 | 2/1998 |
| EP | 1666546 | 6/2006 |
| EP | 1710756 | 10/2006 |
| EP | 1819525 | 3/2010 |
| EP | 2165774 | 3/2010 |
| EP | 2263806 | 12/2010 |
| EP | 2263807 | 12/2010 |
| EP | 2306222 | 4/2011 |
| EP | 2325677 | 5/2011 |
| EP | 2402401 | 1/2012 |
| EP | 1878773 | 8/2012 |
| EP | 1674282 | 6/2013 |
| EP | 3357043 | 8/2018 |
| JP | 2001092916 | 4/2001 |
| JP | 2011023015 | 2/2011 |
| WO | 200209002 | 1/2002 |
| WO | 2002025599 | 3/2002 |
| WO | 2002073250 | 9/2002 |
| WO | 2002090002 | 11/2002 |
| WO | 2003000801 | 1/2003 |
| WO | 2004007095 | 1/2004 |
| WO | 2005002866 | 1/2005 |
| WO | 2006061301 | 6/2006 |
| WO | 2007131833 | 11/2007 |
| WO | 2011092502 | 8/2011 |
| WO | 2012104098 | 8/2012 |
| WO | 2012136902 | 10/2012 |
| WO | 2013071960 | 5/2013 |
| WO | 2015052318 | 4/2015 |
| WO | 2015193152 | 12/2015 |
| WO | 2017055277 | 4/2017 |
| WO | 2017211450 | 12/2017 |

OTHER PUBLICATIONS

R. C. Gonzalez, T. E. Woods, "Digital Image Processing", Fourth Edition, Pearsons, 2017, 1022 pages.

C. M. Bishop, "Pattern Recognition and Machine Learning", Springer, 2006, 758 pages.

O. Mazhelis, "One-Class Classifiers: A Review and Analysis of Suitability in the Context of Mobile-Masquerader Detection," South African Computer Journal, col. 36, pp. 29-48, 2006.

I. GoodFellow, Y. Bengio, A. Courville, "Deep Learning", MIT Press, 2016, 800 pages.

International Search Report and Written Opinion issued with respect to application No. PCT/EP2020/053331.

Written Opinion of the International Preliminary Examining Authority issued with respect to application No. PCT/EP2020/053331.

Chinese Patent Office Action in counterpart Chinese Application No. 202080017285.3 dated Mar. 28, 2023 (and English language translation of Office Action).

* cited by examiner

METHOD FOR AUTHENTICATING A MAGNETICALLY INDUCED MARK WITH A PORTABLE DEVICE

TECHNICAL FIELD

The present application relates to a method for authenticating a mark on a substrate, said mark printed with an ink comprising magnetic or magnetizable pigment particles, and to a portable device, preferably a smartphone, for implementing said method.

BACKGROUND OF THE INVENTION

It is known in the art to use inks, compositions, coatings or layers containing oriented magnetic or magnetizable pigment particles, particularly also optically variable magnetic or magnetizable pigment particles, for the production of security elements in the form of magnetically induced mark, e.g. in the field of security documents. Coatings or layers comprising oriented magnetic or magnetizable pigment particles are disclosed for example in U.S. Pat. Nos. 2,570,856; 3,676,273; 3,791,864; 5,630,877 and 5,364,689. Coatings or layers comprising oriented magnetic color-shifting pigment particles, resulting in particularly appealing optical effects, useful for the protection of security documents, have been disclosed in WO 2002/090002 A2 and WO 2005/002866 A1.

Magnetic or magnetizable pigment particles in printing inks or coatings allow for the production of magnetically induced marks, designs and/or patterns through the application of a corresponding magnetic field, causing a local orientation of the magnetic or magnetizable pigment particles in the unhardened coating, followed by hardening the latter. The result is a fixed magnetically induced mark, design or pattern. Materials and technologies for the orientation of magnetic or magnetizable pigment particles in coating compositions have been disclosed in U.S. Pat. Nos. 2,418,479; 2,570,856; 3,791,864, DE 2006848-A, U.S. Pat. Nos. 3,676,273, 5,364,689, 6,103,361, EP 0 406 667 B1; US 2002/0160194; US 2004/70062297; US 2004/0009308; EP 0 710 508 A1; WO 2002/09002 A2; WO 2003/000801 A2; WO 2005/002866 A1; WO 2006/061301 A1; these documents are incorporated herein by reference. In such a way, magnetically induced marks which are highly resistant to counterfeit can be produced. The so-obtained magnetically induced marks produce an angular reflection profile that is substantially asymmetric with respect to the normal to the substrate onto which it is applied. This is unusual and differs from the classical specular or Lambertian reflection/scattering behavior.

Security features, e.g. for security documents, can generally be classified into "covert" security features on the one hand, and "overt" security features on the other hand. The protection provided by covert security features relies on the concept that such features are difficult to detect, typically requiring specialized equipment and knowledge for detection, whereas "overt" security features rely on the concept of being easily detectable with the unaided human senses, e.g. such features may be visible and/or detectable via the tactile senses while still being difficult to produce and/or to copy. Magnetically induced marks are typically used as "overt" (or level 1) security features which should allow direct and unambiguous authentication by the human without any external device or tool. However, the effectiveness of overt security features depends to a great extent on their easy recognition as a security feature, because most users, and particularly those having no prior knowledge of the security features of a document or item secured therewith, will only then actually perform a security check based on said security feature if they have actual knowledge of their existence and nature.

Even though the security level of magnetically induced marks is high in terms of resistance to copy, the average consumer could potentially be confused as to which exact effect should be observed for a particular overt security element on a given product. In particular, a flipping hologram (low security, low cost security element) producing a similar pattern or logo may lead to misinterpretation of authenticity by untrained consumer, as it will also produce an angular dependent reflection pattern.

Many authentication methods using a smartphone have emerged these recent years. Most of them rely on the imaging capabilities of the smartphone camera to extract geometrical or topological information below the human eye resolution, such as the one disclosed in WO 0225599 A1, or beyond the capability of humans to extract signals very close to the noise or to interpret weak variations in the printed design colors or shapes, as disclosed in WO 2013071960 A1. These methods have the advantage of extracting a coded information for identification but require, on the other hand, a high-resolution printing and/or magnifying optics attached to the smartphone camera.

Other authentication methods applicable to low resolution printed features have been developed which rely on a colorimetric analysis of the security feature, as disclosed in US 2011190920, based on holograms, or such as the SICPASMART™ disclosed in WO 2015052318 A1, which analyses the colorshifting properties of optically variable patterns measured during an augmented reality assisted azimuthal displacement of the smartphone around the pattern. These methods rely on a smartphone camera movement with respect to the mark which is complicated to achieve. Moreover, they depend on external light illumination and hence are highly sensitive to ambient light conditions (e.g. direct sunlight, dark environment or highly chromatically unbalanced illumination).

Other authentication methods of features having angular dependence of the reflected intensity have been proposed, such as randomly oriented flakes, as disclosed in WO 2012 136902 A1 and US 20140224879, micro-mirror, diffractive features like holograms or embossed 3D structures, as disclosed in WO 2015193152 A1 or US 2016378061. These are based on two-angular positions of the camera to capture two images which are then analyzed.

It remains a challenge to control both the camera of the smartphone and the sample illumination in order to obtain reproducible measurements of the reflectivity of a security feature. Smartphone cameras normally use automated exposure and focusing algorithms which are adapted to typical camera usage (e.g. landscape or portrait photographs) but such algorithms are not adapted to imaging of highly reflective marks with magnetically induced marks. The illumination of the security feature can originate from the ambient lightning indoors or outdoors which is in general unknown and difficult to control and can hamper reliable detection of the specific security features of magnetically induced mark such as angular reflectivity.

Accordingly, currently known smartphone-based authentication techniques have a number of disadvantages including the following ones: they require high resolution printing of fine structures; and/or they rely on complex smartphone movements to reveal a color, and/or they are not reliable due to limited available information to accurately authenticate the exact angular dependence (for example: methods where only two angular positions of the camera are used in the prior art).

It is therefore desired to propose to the public, and potentially also to the relevant inspectors, an improved, accurate and reliable technical solution that is robust against ambient light perturbations, does not rely on high resolution printing or on complex movement of the smartphone and avoids a difficult to control and non-intuitive tilted or azimuthal position or rotation movement.

In particular, there is a need for an authentication method and device, which can unambiguously distinguish a given magnetically induced mark from another one or from another overt security feature produced with other techniques and from an imitation based on another technology that attempts to mimic or simulate the effect but reproduces the security feature or logo topology and has some angular dependence of the reflected intensity.

It is therefore an object of the present invention to provide a method of authenticating a magnetically induced mark used as overt security feature printed or affixed on a substrate (such as a label, product or document), using a portable device, preferably a smartphone, in order to overcome the disadvantages of the prior art.

It is a further object of the present invention to provide a portable device, preferably a smartphone, for authenticating a magnetically induced mark applied on a substrate, which is easy to control, which has a good immunity to ambient light variability and is highly discriminating against imitations and selective against other angular dependent reflective marks.

It is a further object of the present invention to provide a corresponding non-transitory computer-readable medium comprising computer code parts or instructions executable by a processor to cause a portable device equipped with a light source and an imager to perform the method of authenticating as described herein.

SUMMARY OF THE INVENTION

According to one aspect, the present invention relates to a method of authenticating a magnetically induced mark on a substrate and comprising a zone with a plane layer of a material including magnetically oriented partially reflective platelet-shaped magnetic or magnetizable pigment particles, with a portable device equipped with a light source operable to deliver visible light, an imager, a processor and a memory, the method comprising:
  disposing the imager of the portable device at a given distance L over the zone of the magnetically induced mark;
  illuminating the zone of the mark with the light source and taking a plurality of digital images of the illuminated zone with the imager being for each different digital image at a corresponding distinct viewing angle θ with respect to said zone, by moving the imager above the magnetically induced mark in a direction parallel to the plane layer;
  for each digital image, calculating, with the processor, a corresponding average intensity I of the light reflected by the pigments particles and collected by the imager at corresponding viewing angle θ;
  storing the calculated average intensities of the reflected light and corresponding viewing angles to obtain a reflected light intensity curve I(θ);
  comparing the stored reflected light intensity curve I(θ) with a stored reference reflected light intensity curve Iref(θ) for said magnetically induced mark, and
  determining whether the magnetically induced mark is genuine based on a result of the comparison.

According to the aspect of the present invention, the imager of the portable device is a camera, preferably, a smartphone camera. In particular, the method takes advantage of the geometrical arrangement of the smartphone camera and of its built-in flash light which allows to selectively obtain reflection of the flash light by the partially reflective platelet-shaped magnetic or magnetizable pigment particles to the camera for a specific position of the smartphone body. This position is pre-determined by the knowledge and the control of the precise particles' orientation angle, the knowledge of the camera magnification and flash to camera distance and a prescribed camera to mark distance.

In this way, a magnetically induced mark with a given partially reflective platelet-shaped magnetic or magnetizable pigment particles orientation angle can be distinguished with accuracy from another mark with different particles' orientation angle or marks producing similar effect, based on holographic films or micro-mirror-based designs, for example. The use of the flash illumination with well-known position in respect to the camera decreases the influence of ambient illumination on the measurement and increase the accuracy of the authentication. Further, a suitable graphical user interface provides guidance to the user, such as a target on the smartphone display, to position accurately the smartphone at the correct location. A sequence of images of the magnetically induced mark is then acquired with the flash light on, while moving the smartphone parallel to the plane of the mark at a prescribed distance. This image sequence is then analyzed by image processing algorithms to extract reflective area from the mark or local intensity pattern that contains said mark or a part of it. For example, the image processing algorithms comprise the extraction of intensity values from at least one predetermined area (zone) of the images corresponding to specific designs of the magnetically induced mark where the reflected intensity from the partially reflective platelet-shaped magnetic or magnetizable pigment particles is expected, or not for a given security image design and position of the smartphone with respect to the image. Criteria on the intensity value (level) of these zones as a function of the position (and hence of the viewing angles) are used to determine if the magnetically induced mark is authentic or not. In one embodiment, the stored reflected light intensity curve I(θ) is compared with a stored reference reflected light intensity curve $I_{ref}(\theta)$ for said image, and determining whether the magnetically induced mark is genuine is based on a result of the comparison, i.e. matching of curves within a given tolerance criterion. Preferably, the reference reflected light intensity curve $I_{ref}(\theta)$ for said magnetically induced mark is stored in the memory of the portable device or on the remote server connectable to the portable device via any communication means.

In a further aspect of the present invention, the method comprises calculating a rate of change of the reflected light intensity curve I(θ) to determine an angular value and corresponding value of an intensity peak of the curve; comparing respectively the calculated angular value and the intensity peak value with a stored reference angular value and intensity peak value for said magnetically induced mark. In this case, determining whether the magnetically induced mark is genuine is further based on a result of said comparison. Preferably, the reference angular value and intensity peak value for said magnetically induced mark are stored in the memory of the portable device or on the remote server connectable to the portable device via any communication means.

In other words, a reflection intensity profile can be extracted as a function of the position (equivalent to angular variation), it can be transformed to angular reflectance profile which contains additional specific information that could be used as authentication criteria (such as the profile width, peak position, skew, asymmetry, inflection point(s) and other features). The profile can be fed to a machine learning algorithm (e.g. decision trees) to define rules for authentication that use features in the profiles specific to magnetically induced marks.

In a further aspect of the present invention, the method further comprising calculating a variance of the reflected light intensity over said zone of the magnetically induced mark from the acquired digital images, comparing the calculated variance with a reference value of the variance for said image, wherein determining whether the magnetically induced mark is genuine is further based on a result of said comparison. Preferably, the reference value of the variance for said magnetically induced mark is stored in the memory of the portable device or on the remote server connectable to the portable device via any communication means.

Some reference background printing area that produce Lambertian (symmetrical) reflection/scattering behavior, could also be used to make intensity corrections and account for potential irradiation non-uniformity, variations of illumination due variable distance to sample, or variations in the image acquisition parameters (such as gain or exposure time).

A geometrical reference pattern of known shape and dimensions can be printed nearby or over the partially reflective platelet-shaped magnetic or magnetizable pigment particles' image to allow finding the magnetically induced mark on the substrate, to do perspective correction, and to correct small variations in the smartphone distance or tilts in respect to the substrate during a scanning.

Accordingly, the method further comprises reading the geometrical reference pattern, which at least partially overlapping the zone of the magnetically induced mark and being in the form of an encoded mark such as an encoded alphanumeric data, one-dimensional barcode, two-dimensional barcode, QR-code or datamatrix. This, in addition, allows identification of the security mark for traceability purposes. The geometrical reference pattern becomes fully readable only at a certain angular value corresponding to non-specular reflection of illumination light so that the zone appears as a uniform background, thus allowing the device to decode the pattern.

According to one embodiment, at least one zone of the magnetically induced mark comprises magnetically oriented partially reflective platelet-shaped magnetic or magnetizable pigment particles, which are co-parallel. Said zone thus represents an overt security feature which produces a reflection intensity profile that is substantially asymmetric with respect to the normal to the substrate. This orientation pattern is known as Venetian-blind effects, wherein the platelet-shaped magnetic or magnetizable pigment particles have their magnetic axis parallel to each other and parallel to a plane, wherein said plane is not parallel to the substrate onto which said particles are applied. In particular, optical effects wherein the partially reflective platelet-shaped magnetic or magnetizable pigment particles are parallel to each other and have a substantially the same elevation angle of the pigment particle planes of at least 30° with respect to the plane of the substrate onto which the particles are applied. Methods for producing Venetian-blind effects are disclosed for example in U.S. Pat. No. 8,025,952 and EP 1 819 525 B1.

Alternatively, or in addition, the magnetically oriented mark comprises a first zone including magnetically oriented partially reflective platelet-shaped magnetic or magnetizable pigment particles, which are co-parallel in one first direction, and a second zone with partially reflective platelet-shaped magnetic or magnetizable pigment particles oriented in a second direction, different from the first direction. The effects obtained with this orientation pattern are known as flip-flop effects, wherein the mark includes a first portion and a second portion separated by a transition, wherein the particles are aligned parallel to a first plane in the first portion and particles in the second portion are aligned parallel to a second plane. Methods for producing flip-flop effects are disclosed for example in EP 1 819 525 B1 and EP 1 819 525 B1. In this case, preferably, image processing algorithms comprise the extraction of intensity values from the two predetermined zones of the magnetically induced mark as a function of the position of the image with respect to the smartphone during the image (e.g. video) sequence. In particular the rate of intensity variance from each of the two zones of the magnetically induced mark as a function of the position of the image is extracted.

In another aspect, the present invention provides a portable device for authenticating a magnetically induced mark on a substrate and comprising a zone with a plane layer of a material including oriented partially reflective platelet-shaped magnetic or magnetizable pigment particles, said device comprising:
  a light source operable to deliver visible light and illuminating the zone of the magnetically induced mark,
  an imager operable to take a plurality of digital images of the illuminated zone, for each different image at a corresponding distinct viewing angle θ with respect to said zone, while moving above the magnetically induced mark in a direction substantially parallel to the plane layer,
  a memory for storing the calculated average intensities of the reflected light and corresponding viewing angles to obtain a reflected light intensity curve I(θ), and
  a processor operable to compare the stored reflected light intensity curve I(θ) with a stored reference reflected light intensity curve $I_{ref}(\theta)$ for said mark, and determining whether the mark is genuine based on a result of the comparison.

In a further aspect of the present invention, the processor is operable to calculate a rate of the change of the reflected light intensity curve I(θ) to determine an angular value and corresponding value of an intensity peak of the curve, to compare the calculated angular value and the intensity peak with a stored reference angular value and intensity peak value for said mark, respectively, and to further base the decision whether the magnetically induced mark is genuine on a result of said comparison.

In a further aspect of the present invention, the processor is operable to calculate a variance of the reflected light intensity over said zone of the magnetically induced from the acquired digital images, to compare the calculated variance with a reference value of the variance for said mark, and to further base the decision whether the magnetically induced mark is genuine on a result of said comparison.

In a further aspect of the present invention, the device is further operable to read a geometrical reference pattern, the geometrical reference pattern at least partially overlapping the zone of the magnetically induced and being in the form of an encoded mark selected from encoded alphanumeric data, one-dimensional barcode, two-dimensional barcode, QR-code or datamatrix.

In a further aspect of the present invention, the portable device is a smartphone or tablet.

In another aspect, the present invention provides a non-transitory computer-readable medium comprising computer code parts or instructions executable by a processor to cause a portable device equipped with a light source operable to deliver visible light and an imager, to perform the method of authenticating a mark as described herein.

The present invention will be described more fully hereinafter with reference to the accompanying drawings, in which prominent aspects and features of the invention, which are no way limiting, are illustrated.

DETAILED DESCRIPTION

Figure 1:
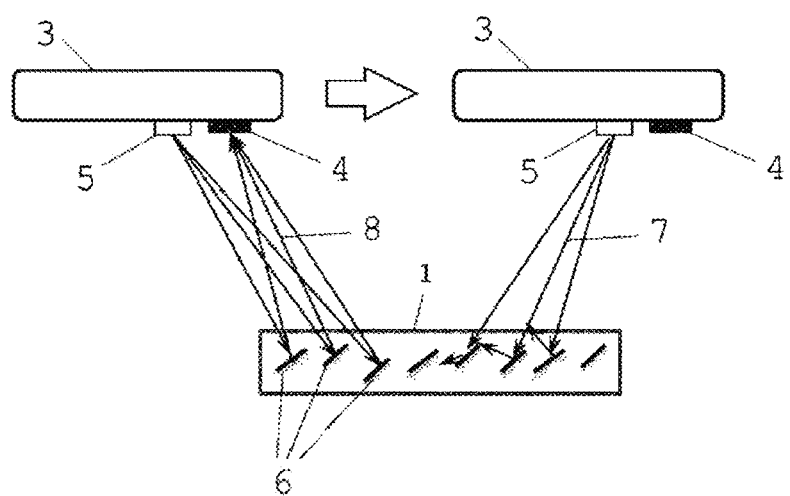
FIG. 1 is a schematic illustration of detecting magnetically oriented partially reflective platelet-shaped magnetic or magnetizable pigment particles of a magnetically induced mark by the smartphone due to particles reflection (or not) depending on its position relative to the mark.

In the following, the reference will be made to the Figures in describing various embodiments of the disclosure. This description serves to better understand the concept of the embodiments of the disclosure and points out certain preferable modifications of the general concept.

It should be noted that the key advantages of the present invention require some specificities of the magnetically induced marks in order to be authenticated robustly and reliably, namely:

A sharp angular dependence of local reflectivity should be present;

The angular dependence should be azimuthally asymmetric with respect to the normal to the mark axis;

The angular dependence should be well controllable by the marking process and is determined by the co-parallel alignment of the reflecting elements;

The background and mark surrounding should also be controlled.

These requirements may be satisfied by several candidates of security features used in the art as overt features in various application of security printing, for banknotes, labels and tax stamps, or secure documents, like passports, checks or credit cards. The main examples of these candidates are:

(A) magnetically induced marks comprising oriented partially reflective platelet-shaped magnetic or magnetizable pigment particles;

(B) arrangements of micro-mirrors embossed onto metallic substrates or films;

(C) arrangements of micro-lenses in an array with masks over a reflective pattern;

(D) diffractive structures such as holographic foils or embossed diffractive structures.

In contrast to needle-shaped pigment particles which can be considered as one-dimensional particles, platelet-shaped pigment particles are two-dimensional particles due to the large aspect ratio of their dimensions. A platelet-shaped pigment particle can be considered as a two-dimensional structure wherein the dimensions X and Y are substantially larger than dimension Z. Platelet-shaped pigment particles are also referred in the art as oblate particles or flakes. Such pigment particles may be described with a main axis X corresponding to the longest dimension crossing the pigment particle and a second axis Y perpendicular to X which also lies within said pigment particles. The magnetically induced marks described herein comprise oriented partially reflective platelet-shaped magnetic or magnetizable pigment particles that, due to their shape, have non-isotropic reflectivity. As used herein, the term "non-isotropic reflectivity" denotes that the proportion of incident radiation from a first angle that is reflected by a particle into a certain (viewing) direction (a second angle) is a function of the orientation of the particles, i.e. that a change of the orientation of the particle with respect to the first angle can lead to a different magnitude of the reflection to the viewing direction. Preferably, the partially reflective platelet-shaped magnetic or magnetizable pigment particles described herein have a non-isotropic reflectivity with respect to incident electromagnetic radiation in some parts or in the complete wavelength range of from about 200 to about 2500 nm, more preferably from about 400 to about 700 nm, such that a change of the particle's orientation results in a change of reflection by that particle into a certain direction. Thus, even if the intrinsic reflectivity per unit surface area (e.g. per $\mu m^2$) is uniform across the whole surface of platelet-shaped particle, due to its shape, the reflectivity of the particle is non-isotropic as the visible area of the particle depends on the direction from which it is viewed. As known by the man skilled in the art, the partially reflective platelet-shaped magnetic or magnetizable pigment particles described herein are different from conventional pigments, in that said conventional pigment particles exhibit the same color and reflectivity, independent of the particle orientation, whereas the magnetic or magnetizable pigment particles described herein exhibit either a reflection or a color, or both, that depend on the particle orientation.

Examples of partially reflective platelet-shaped magnetic or magnetizable pigment particles described herein include without limitation pigment particles comprising a magnetic layer M made from one or more of a magnetic metal such as cobalt (Co), iron (Fe), gadolinium (Gd) or nickel (Ni); and a magnetic alloy of iron, chromium, cobalt or nickel, wherein said platelet-shaped magnetic or magnetizable pigment particles may be multilayered structures comprising one or more additional layers. Preferably, the one or more additional layers are layers A independently made from one or more selected from the group consisting of metal fluorides such as magnesium fluoride ($MgF_2$), silicon oxide (SiO), silicon dioxide ($SiO_2$), titanium oxide ($TiO_2$), and aluminum oxide ($Al_2O_3$); or layers B independently made from one or more selected from the group consisting of metals and metal alloys, preferably selected from the group consisting of reflective metals and reflective metal alloys, and more preferably selected from the group consisting of aluminum (Al), chromium (Cr), and nickel (Ni), and still more preferably aluminum (Al); or a combination of one or more layers A such as those described hereabove and one or more layers B such as those described hereabove. Typical examples of the platelet-shaped magnetic or magnetizable pigment particles being multilayered structures described hereabove include without limitation A/M multilayer structures, A/M/A multilayer structures, A/M/B multilayer structures, A/B/M/A multilayer structures, A/B/M/B multilayer structures, A/B/M/B/A multilayer structures, B/M multilayer structures, B/M/B multilayer structures, B/A/M/A multilayer structures, B/A/M/B multilayer structures, B/A/M/B/A multilayer structures, wherein the layers A, the magnetic layers M and the layers B are chosen from those described hereabove.

According to one embodiment, at least a part of the partially reflective platelet-shaped magnetic or magnetizable pigment particles described herein are dielectric/reflector/magnetic/reflector/dielectric multilayer structures and dielectric/reflector/dielectric/magnetic/reflector/dielectric multilayer structures, wherein the reflector layers described herein are independently and preferably made from one or more selected from the group consisting of metals and metal alloys, preferably selected from the group consisting of reflective metals and reflective metal alloys, more preferably selected from the group consisting of aluminum (Al), silver (Ag), copper (Cu), gold (Au), platinum (Pt), tin (Sn), titanium (Ti), palladium (Pd), rhodium (Rh), niobium (Nb), chromium (Cr), nickel (Ni), and alloys thereof, even more preferably selected from the group consisting of aluminum (Al), chromium (Cr), nickel (Ni) and alloys thereof, and still more preferably aluminum (Al), wherein the dielectric layers are independently and preferably made from one or more selected from the group consisting of metal fluorides such as magnesium fluoride ($MgF_2$), aluminum fluoride ($AlF_3$), cerium fluoride ($CeF_3$), lanthanum fluoride ($LaF_3$), sodium aluminum fluorides (e.g. $Na_3AlF_6$), neodymium fluoride ($NdF_3$), samarium fluoride ($SmF_3$), barium fluoride ($BaF_2$), calcium fluoride ($CaF_2$), lithium fluoride (LiF), and metal oxides such as silicon oxide (SiO), silicon dioxide ($SiO_2$), titanium oxide ($TiO_2$), aluminum oxide ($Al_2O_3$), more preferably selected from the group consisting of magnesium fluoride ($MgF_2$) and silicon dioxide ($SiO_2$) and still more preferably magnesium fluoride ($MgF_2$), and the magnetic, the magnetic layer preferably comprises nickel (Ni), iron (Fe), and/or cobalt (Co); and/or a magnetic alloy comprising nickel (Ni), iron (Fe), chromium (Cr) and/or cobalt (Co); and/or a magnetic oxide comprising nickel (Ni), iron (Fe), chromium (Cr) and/or cobalt (Co). Alternatively, the dielectric/reflector/magnetic/reflector/dielectric multilayer structures described herein may be multilayer pigment particles being considered as safe for human health and the environment, wherein said the magnetic layer comprises a magnetic alloy having a substantially nickel-free composition including about 40 wt-% to about 90 wt-% iron, about 10 wt-% to about 50 wt-% chromium and about 0 wt-% to about 30 wt-% aluminum. Particularly suitable partially reflective platelet-shaped magnetic or magnetizable pigment particles having the dielectric/reflector/magnetic/reflector/dielectric multilayer structure include without limitation $MgF_2$/Al/magnetic/Al/$MgF_2$ wherein the magnetic layer comprises iron, preferably comprises a magnetic alloy or mixture of iron and chromium.

Alternatively, the partially reflective platelet-shaped magnetic or magnetizable pigment particles described herein may be partially reflective platelet-shaped colorshifting magnetic or magnetizable pigment particles, in particular magnetic thin-film interference pigment particles. Colorshifting elements (also referred in the art as goniochromatic elements), such as for example pigments particles, inks, coatings or layers are known in the field of security printing exhibit a viewing-angle or incidence-angle dependent color, and are used to protect security documents against counterfeiting and/or illegal reproduction by commonly available color scanning, printing and copying office equipment.

Magnetic thin film interference pigment particles are known to those skilled in the art and are disclosed e.g. in U.S. Pat. No. 4,838,648; WO 2002/073250 A2; EP 0 686 675 B1; WO 2003/000801 A2; U.S. Pat. No. 6,838,166; WO 2007/131833 A1; EP 2 402 401 A1 and in the documents cited therein. Preferably, the magnetic thin film interference pigment particles comprise pigment particles having a five-layer Fabry-Perot multilayer structure and/or pigment particles having a six-layer Fabry-Perot multilayer structure and/or pigment particles having a seven-layer Fabry-Perot multilayer structure.

Preferred five-layer Fabry-Perot multilayer structures consist of absorber/dielectric/reflector/dielectric/absorber multilayer structures wherein the reflector and/or the absorber is also a magnetic layer, preferably the reflector and/or the absorber is a magnetic layer comprising nickel, iron and/or cobalt, and/or a magnetic alloy comprising nickel, iron and/or cobalt and/or a magnetic oxide comprising nickel (Ni), iron (Fe) and/or cobalt (Co).

Preferred six-layer Fabry-Perot multilayer structures consist of absorber/dielectric/reflector/magnetic/dielectric/absorber multilayer structures.

Preferred seven-layer Fabry Perot multilayer structures consist of absorber/dielectric/reflector/magnetic/reflector/dielectric/absorber multilayer structures such as disclosed in U.S. Pat. No. 4,838,648.

Preferably, the reflector layers of the Fabry-Perot multilayer structures described herein are independently made from the one or more materials such as those described hereabove. Preferably, the dielectric layers of the Fabry-Perot multilayer structures are independently made from the one or more materials such as those described hereabove Preferably, the absorber layers are independently made from one or more selected from the group consisting of aluminum (Al), silver (Ag), copper (Cu), palladium (Pd), platinum (Pt), titanium (Ti), vanadium (V), iron (Fe) tin (Sn), tungsten (W), molybdenum (Mo), rhodium (Rh), Niobium (Nb), chromium (Cr), nickel (Ni), metal oxides thereof, metal sulfides thereof, metal carbides thereof, and metal alloys thereof, more preferably selected from the group consisting of chromium (Cr), nickel (Ni), metal oxides thereof, and metal alloys thereof, and still more preferably selected from the group consisting of chromium (Cr), nickel (Ni), and metal alloys thereof.

Preferably, the magnetic layer comprises nickel (Ni), iron (Fe) and/or cobalt (Co); and/or a magnetic alloy comprising nickel (Ni), iron (Fe) and/or cobalt (Co); and/or a magnetic oxide comprising nickel (Ni), iron (Fe) and/or cobalt (Co). When magnetic thin film interference pigment particles comprising a seven-layer Fabry-Perot structure are preferred, it is particularly preferred that the magnetic thin film interference pigment particles comprise a seven-layer Fabry-Perot absorber/dielectric/reflector/magnetic/reflector/dielectric/absorber multilayer structure consisting of a $Cr/MgF_2/Al/Ni/Al/MgF_2/Cr$ multilayer structure.

The magnetic thin film interference pigment particles described herein may be multilayer pigment particles being considered as safe for human health and the environment and being based for example on five-layer Fabry-Perot multilayer structures, six-layer Fabry-Perot multilayer structures and seven-layer Fabry-Perot multilayer structures, wherein said pigment particles include one or more magnetic layers comprising a magnetic alloy having a substantially nickel-free composition including about 40 wt-% to about 90 wt-% iron, about 10 wt-% to about 50 wt-% chromium and about 0 wt-% to about 30 wt-% aluminum. Typical examples of multilayer pigment particles being considered as safe for human health and the environment can be found in EP 2 402 401 A1 which is hereby incorporated by reference in its entirety.

The dielectric/reflector/magnetic/reflector/dielectric multilayer structures described herein, the absorber/dielectric/reflector/dielectric/absorber multilayer structures described herein, the absorber/dielectric/reflector/magnetic/dielectric/absorber multilayer structures described herein and the absorber/dielectric/reflector/magnetic/reflector/dielectrid-absorber multilayer structures described herein are typically manufactured by a conventional deposition technique of the different required layers onto a web. After deposition of the desired number of layers, e.g. by physical vapor deposition (PVD), chemical vapor deposition (CVD) or electrolytic deposition, the stack of layers is removed from the web, either by dissolving a release layer in a suitable solvent, or by stripping the material from the web. The so-obtained material is then broken down to platelet-shaped magnetic or magnetizable pigment particles which have to be further processed by grinding, milling (such as for example jet milling processes) or any suitable method so as to obtain pigment particles of the required size. The resulting product consists of platelet-shaped magnetic or magnetizable pigment particles with broken edges, irregular shapes and different aspect ratios. Further information on the preparation of suitable pigment particles can be found e.g. in EP 1 710 756 A1 and EP 1 666 546 A1 which are hereby incorporated by reference.

The magnetically induced marks described herein are prepared by a process comprising the steps of: applying on a substrate a coating composition comprising the partially reflective platelet-shaped magnetic or magnetizable pigment particles described herein; exposing the coating composition to the magnetic field of a magnetic-field-generating device, thereby orienting at least a part of partially reflective platelet-shaped magnetic or magnetizable pigment particles; and hardening the coating composition so as to fix the pigment particles in their adopted positions and orientations. Detailed description of these steps processed along with coating compositions can be found in the following patent documents and the related references therein: US 2016176223 and US 2003170471.

The applying step described herein is carried out by a printing process preferably selected from the group consisting of screen printing, rotogravure printing and flexography printing. These processes are well-known to the skilled man and are described for example in Printing Technology, J. M. Adams and P. A. Dolin, Delmar Thomson Learning, $5^{th}$ Edition, p 293, 332, and 352.

Subsequently to, partially simultaneously or simultaneously with the application of the coating composition on the substrate, the partially reflective platelet-shaped magnetic or magnetizable pigment particles are oriented by the use of an external magnetic field for orienting them according to a desired orientation pattern. The so-obtained orientation pattern may be any pattern.

A large variety of magnetically induced marks can be produced by various methods disclosed for example in U.S. Pat. No. 6,759,097, EP 2 165 774 A1 and EP 1 878 773 B1. Optical effects known as rolling-bar effects may also be produced. Rolling-bar effects show one or more contrasting bands which appear to move ("roll") as the image is tilted with respect to the viewing angle, said optical effects are based on a specific orientation of magnetic or magnetizable pigment particles, said pigment particles being aligned in a curving fashion, either following a convex curvature (also referred in the art as negative curved orientation) or a concave curvature (also referred in the art as positive curved orientation). Methods for producing rolling-bar effects are disclosed for example in EP 2 263 806 A1, EP 1 674 282 B1, EP 2 263 807 A1, WO 2004/007095 A2 and WO 2012/104098 A1. Optical effects known as moving-ring effects may also be produced. Moving-ring effects consists of optically illusive images of objects such as funnels, cones, bowls, circles, ellipses, and hemispheres that appear to move in any x-y direction depending upon the angle of tilt of said optical effect layer. Methods for producing moving-ring effects are disclosed for example in EP 1 710 756 A1, U.S. Pat. No. 8,343,615, EP 2 306 222 A1, EP 2 325 677 A2, WO 2011/092502 A2 and US 2013/084411.

Optical effects known as Venetian-blind effects may be produced. Venetian-blind effects include a portion with pigment particles having their magnetic axis parallel to each other and parallel to a plane, wherein said plane is not parallel to the identity document substrate. In particular, optical effects wherein the pigment particles are parallel to each other and have a positive elevation angle of the pigment particle planes with respect to the plane of the substrate onto which the pigment particles are applied. Venetian-blind effects include pigment particles being oriented such that, along a specific direction of observation, they give visibility to an underlying substrate surface, such that indicia or other features present on or in the substrate surface become apparent to the observer while they impede the visibility along another direction of observation. Methods for producing Venetian-blind effects are disclosed for example in U.S. Pat. No. 8,025,952 and EP 1 819 525 B1.

Optical effects known as flip-flop effects (also referred in the art as switching effect) are may be produced. Flip-flop effects include a first portion and a second portion separated by a transition, wherein the pigment particles are aligned parallel to a first plane in the first portion and pigment particles in the second portion are aligned parallel to a second plane. Methods for producing flip-flop effects are disclosed for example in EP 1 819 525 B1 and EP 1 819 525 B1. Particular suitable orientation patterns include the Venetian-blind effects and the flip-flop effects described hereabove.

The processes for producing the magnetically induced marks described herein comprise, partially simultaneously with step b) or subsequently to step b), a step c) of hardening the coating composition so as to fix the partially reflective platelet-shaped magnetic or magnetizable pigment particles in their adopted positions and orientations in a desired pattern to form the magnetically induced marks, thereby transforming the coating composition to a second state. By this fixing, a solid coating or layer is formed. The term "hardening" refers to processes including the drying or solidifying, reacting, curing, cross-linking or polymerizing the binder components in the applied coating composition, including an optionally present cross-linking agent, an optionally present polymerization initiator, and optionally present further additives, in such a manner that an essentially solid material that adheres to the substrate surface is formed. As mentioned herein, the hardening step may be performed by using different means or processes depending on the materials comprised in the coating composition that also comprises the partially reflective platelet-shaped magnetic or magnetizable pigment particles. The hardening step generally may be any step that increases the viscosity of the coating composition such that a substantially solid material adhering to the supporting surface is formed. The hardening step may involve a physical process based on the evaporation of a volatile component, such as a solvent, and/or water evaporation (i.e. physical drying). Herein, hot air, infrared or a combination of hot air and infrared may be used. Alternatively, the hardening process may include a chemical reaction, such as a curing, polymerizing or cross-linking of the binder and optional initiator compounds and/or optional cross-linking compounds comprised in the coating composition. Such a chemical reaction may be initiated by heat or IR irradiation as outlined above for the physical hardening processes, but may preferably include the initiation of a chemical reaction by a radiation mechanism including without limitation Ultraviolet-Visible light radiation curing (hereafter referred as UV-Vis curing) and electronic beam radiation curing (E-beam curing); oxypolymerization (oxidative reticulation, typically induced by a joint action of oxygen and one or more catalysts preferably selected from the group consisting of cobalt-containing catalysts, vanadium-containing catalysts, zirconium-containing catalysts, bismuth-containing catalysts, and manganese-containing catalysts); cross-linking reactions or any combination thereof. Radiation curing is particularly preferred, and UV-Vis light radiation curing is even more preferred, since these technologies advantageously lead to very fast curing processes and hence drastically decrease the preparation time of any document or article comprising the magnetically induced marks described herein. Moreover, radiation curing has the advantage of producing an almost instantaneous increase in viscosity of the coating composition after exposure to the curing radiation, thus minimizing any further movement of the particles. In consequence, any loss of information after the magnetic orientation step can essentially be avoided. Particularly preferred is radiation-curing by photo-polymerization, under the influence of actinic light having a wavelength component in the UV or blue part of the electromagnetic spectrum (typically 200 nm to 650 nm; more preferably 200 nm to 420 nm). Equipment for UV-visible-curing may comprise a high-power light-emitting-diode (LED) lamp, or an arc discharge lamp, such as a medium-pressure mercury arc (MPMA) or a metal-vapor arc lamp, as the source of the actinic radiation.

Arrangements of micro-mirrors embossed onto metallic substrates or films to produce angular dependent reflective pixels that produce an angular varying image depending on the perspective view as disclosed in WO 2017211450 A1 or in US 2017242263. These security features might produce local angular dependent reflection, although they are distinct by the fact that they cannot completely vanish for any viewing angle. An additional difference resides in the fact that the micro-mirror structures can be produced with high resolution (30-50 micron pitch) to produce fine images. An implementation that produces relatively large angular dependent reflecting zones that could be produced with such structures that could be authenticated using the method disclosed in the present invention. However, these features can be distinguished from the magnetically induced marks comprising the oriented partially platelet-shaped magnetic or magnetizable pigment particles by the spatial variance or entropy in the image, which is higher for the magnetically induced marks than for micro-mirror-based marks.

Arrangements of micro-lenses in an array with masks over a reflective pattern can also produce angular dependent varying images or local reflections such as the one described in US2007273143 (A1). By properly designing the locations of the reflectors behind the masks, the micro lenses and the masks, one could also obtain a sharp angular reflective pattern that could potentially be authenticated using the method disclosed in the present invention.

Diffractive structures such as holographic foils or embossed diffractive structures could potentially also produce such angular dependence, but with angular varying colors, which makes then distinct from the previous examples. Such features are described along with an authentication method using a smartphone camera at two angular positions in WO 2015193152 A1 and in US 2016378061 A1.

In order to better understand the general concept of the disclosure and to point out certain preferable modifications of the general concept, authenticating a mark comprising partially reflective platelet-shaped magnetic or magnetizable pigment particles with a portable device will be further discussed in more detail.

The present method of authenticating magnetically induced marks 1 applied on a substrate 2 via portable device 3 is based on the particular geometrical arrangement of an imager 4, e.g. a smartphone camera, and a light source 5, i.e. a LED flash. On most models of smartphones a camera aperture and the LED flash are located side by side, with a separation of less than 15 mm. Therefore, for a particular magnetic orientation of the platelet-shaped magnetic or magnetizable pigment particles 6 in the mark 1 with respect to the viewing direction, combined with a suitable imaging distance, the geometric condition is fulfilled for the light emitted by the flash, i.e. irradiation 7 to be back reflected to the camera, i.e. reflection 8, whereas for other orientations, the reflection is directed out of the camera. This is illustrated in FIG. 1.

Figure 2:
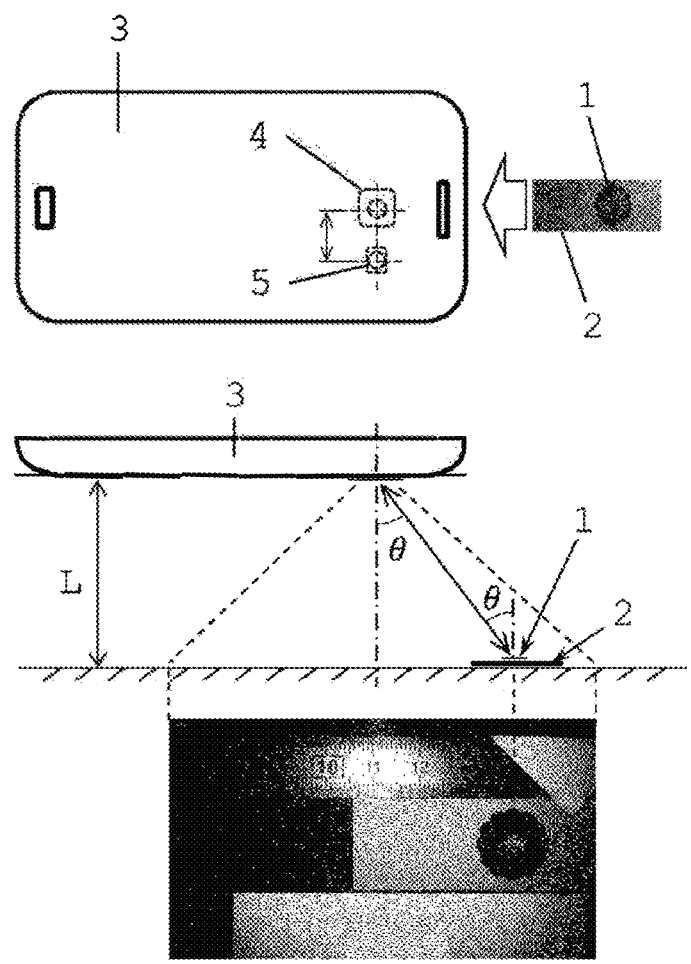
FIG. 2 is an example of a measurement setup with the smartphone and a sample that is scanned in a plane parallel to the smartphone and at fixed distance from the smartphone.

For example, if the magnetically induced mark has a majority of platelet-shaped magnetic or magnetizable pigment particles magnetically oriented at 15° (angle θ) with respect to the normal to the surface so that the incident flash light is reflected predominantly at this direction and the mark will shine when illuminated and observed at angles close to 15° up to a refractive index correction (angle θ) with respect to the normal to the surface of the mark. Moreover, since the angular field of view of the camera 4 is relatively large (typically 30° half angle for a Samsung S3), and the flash divergence angle is the same, the required angular orientation of the platelet-shaped magnetic or magnetizable pigment particles with respect to the camera to capture reflection can still be obtained by keeping the smartphone body parallel to the substrate 2, as shown in FIG. 2. The smartphone 3 is moved parallel to the substrate 2 at a given distance, L, wherein, for example, L=80 mm, while acquiring a set of images or a video sequence to be used for authentication. Alternatively, the magnetically induced mark 1 is also moved in respect to the smartphone 3 in a parallel plane.

Figure 3:
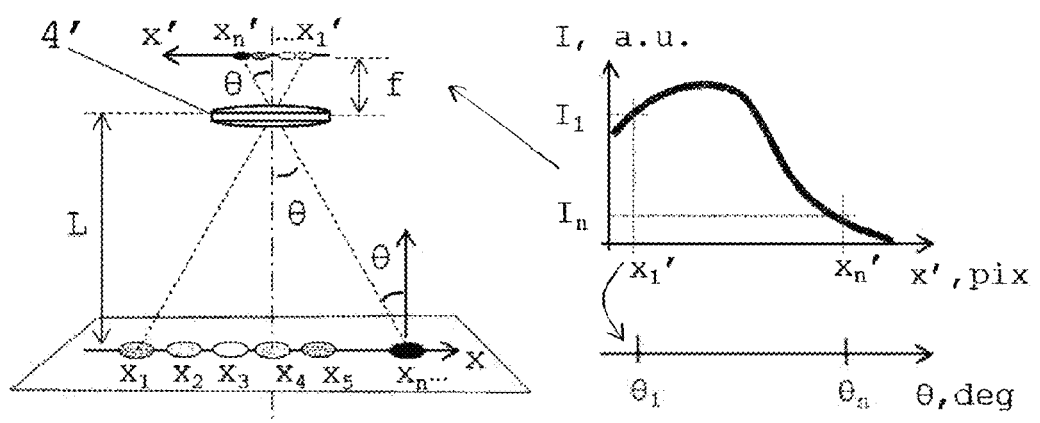
FIG. 3 illustrates the position of the magnetically induced mark in the set of images and an angle of illumination/observation for known smartphone to sample distance with graphical representation of intensity profile.

FIG. 3 illustrates the positions $x_1' \ldots x_n'$ of the magnetically induced mark in the set of images at a corresponding viewing angle θ for the known smartphone to sample distance L, with graphical representation of the lens 4" of camera 4 with effective focal length f and graphical representation of intensity profile of a magnetically induced mark, wherein $I_1 \ldots I_n$ are average intensities at corresponding viewing angle θ.

Figure 4:
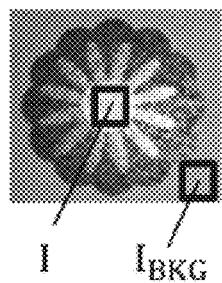
FIG. 4 illustrates intensity and relative intensity profiles of a magnetically induced mark extracted from sequence of images.
Figure 4:
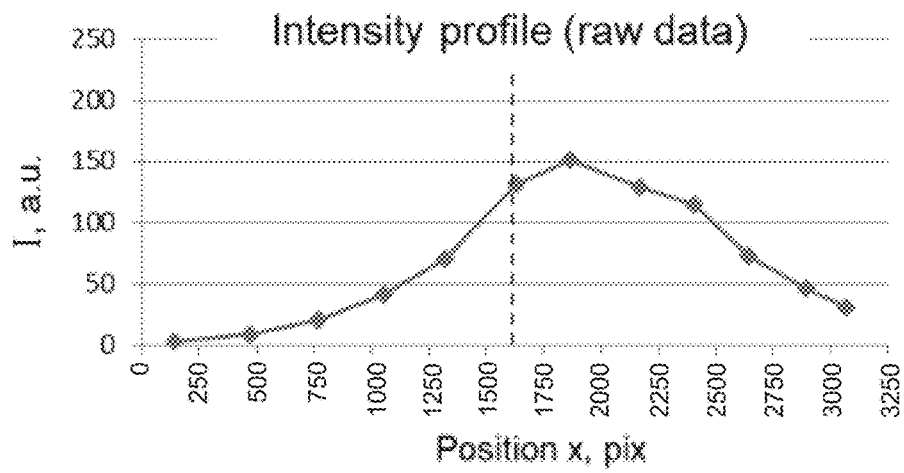
Figure 4:
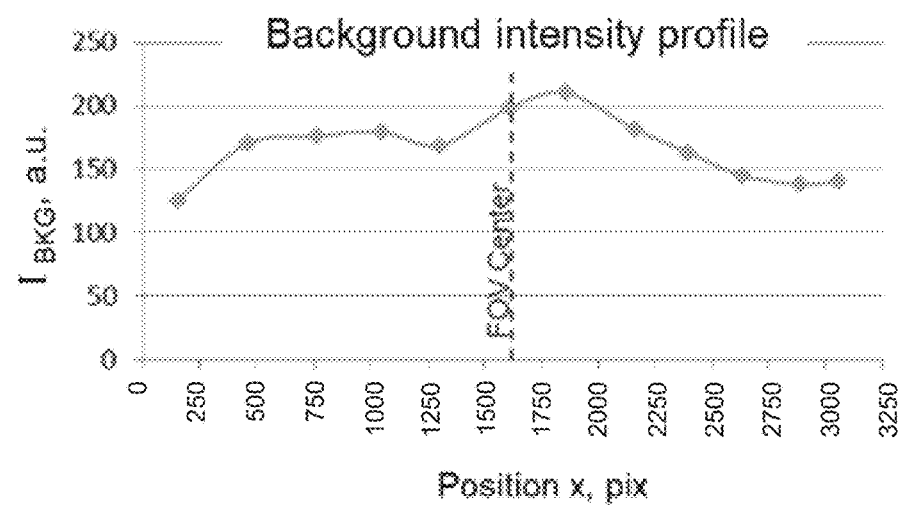
Figure 4:
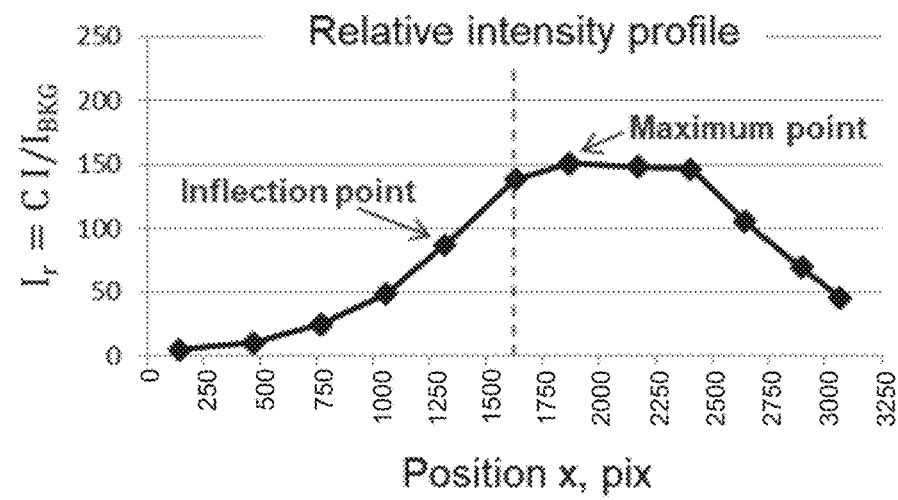

FIG. 4 illustrates intensity and relative intensity profiles of a magnetically induced mark extracted from the sequence of images. The first graph shows non-corrected intensity profile of the magnetically induced mark zone which still represents the effect. The intensity variation of the background (BKG) zone in second graph shows the seemingly random phone auto-adjustments. The third graph shows corrected magnetically induced mark relative intensity profile which reveals the position dependent reflectivity of the mark.

In particular, authenticating is performed by calculating, for each digital image, a corresponding average intensity I of the light reflected by the partially reflective platelet-shaped magnetic or magnetizable pigment particles and collected by the imager at corresponding viewing angle θ;

storing the calculated average intensities of the reflected light and corresponding viewing angles to obtain a reflected light intensity curve $I(\theta)$;

comparing the stored reflected light intensity curve $I(\theta)$ with a stored reference reflected light intensity curve $I_{ref}(\theta)$ for said mark, and determining whether the magnetically induced mark is genuine based on a result of the comparison.

In one proposed embodiment of the invention, the magnetically induced mark is designed so as to exhibit one or more distinct zones, each with a specific orientation of the platelet-shaped magnetic or magnetizable pigment particles. For example, platelet-shaped magnetic or magnetizable pigment particles oriented at 15° to the W direction for the first zone and particles oriented at 15° to the E direction.

Figure 5:
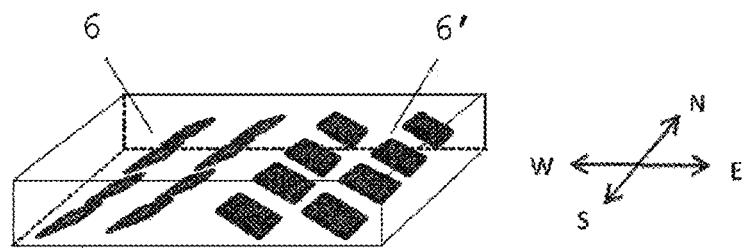
FIG. 5 is a schematic illustration of a magnetically induced mark with magnetically oriented partially reflective platelet-shaped magnetic or magnetizable pigment particles in two opposite directions.

FIG. 5 schematically illustrates a magnetically induced mark 1 with magnetically oriented partially reflective platelet-shaped magnetic or magnetizable pigment particles 6 and 6' in two opposite directions. Some particles are tilted to West and some particles to East direction thus reflecting the incident light in different directions.

Figure 6:
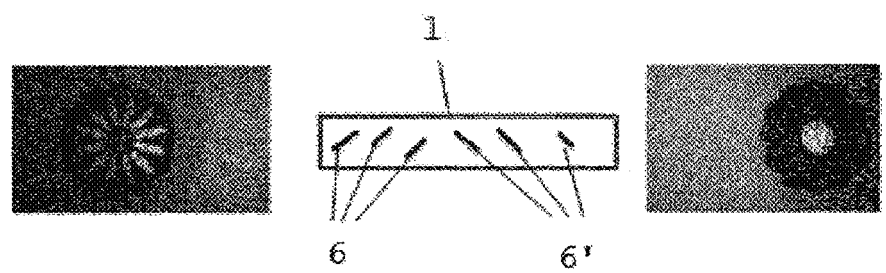
FIG. 6 illustrates a particular printing design of one embodiment of the invention which contains magnetically oriented partially reflective platelet-shaped magnetic or magnetizable pigment particles at two different orientations in different areas of the magnetically induced mark (these two areas could also be at least partially overlapping).
Figure 7:
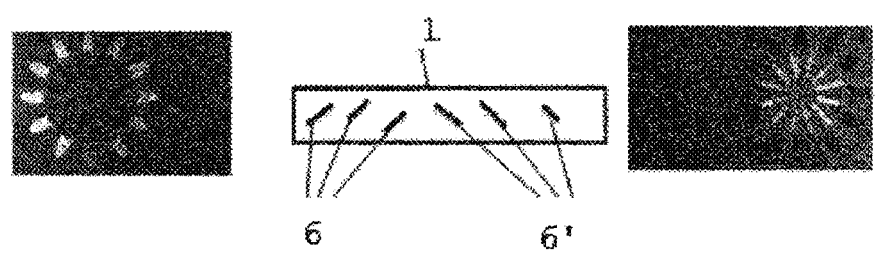
FIG. 7 illustrates a particular printing design of one embodiment of the invention which contains magnetically oriented partially reflective platelet-shaped magnetic or magnetizable pigment particles at two different orientations in different areas of the magnetically induced.
Figure 8:
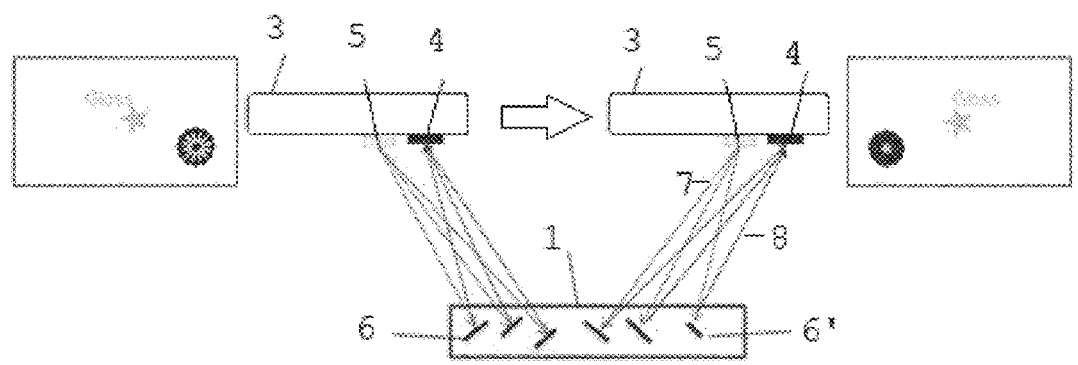
FIG. 8 is a schematic illustration of the smartphone positions over a magnetically induced mark with two different partially reflective platelet-shaped magnetic or magnetizable pigment particles orientations as shown in FIG. 6 or FIG. 7, along with the obtained image frames in these two positions.

Examples of such a magnetically induced mark 1 are shown in FIG. 6, illustrating the mark comprising platelet-shaped magnetic or magnetizable pigment particles 6 (petals) and particles 6' (disks)) and in FIG. 7 illustrating the mark comprising particles 6 (outer petals) and particles 6' (inner petals)). In this way reflection can be obtained from particles of the first zone by placing the mark at the right edge of the field of view of the smartphone, whereas reflection of the other zone is obtained by placing the mark at the left edge of the smartphone field of view. This is further demonstrated in FIG. 8 which shows the smartphone positions and the corresponding images obtained in these positions.

Figure 9:
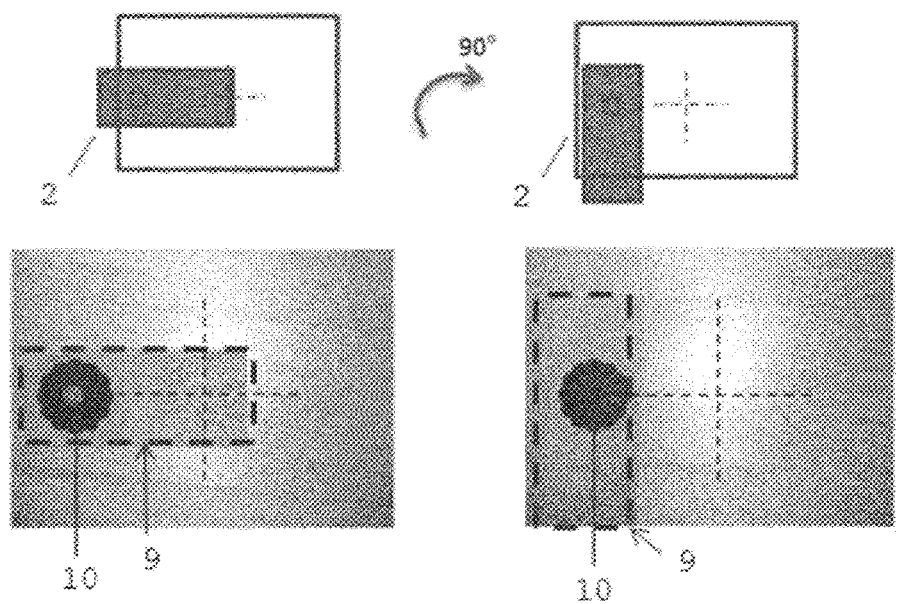
FIG. 9 is a schematic representation of the effect of a 90° rotation of the magnetically induced mark, or of the smartphone in the plane of the mark, and a guiding target on the screen.

In another embodiment of the invention, instead of moving the smartphone in a linear direction parallel to the mark, a 90° rotation of the mark itself, also parallel to its plane can be made. FIG. 9 is a schematic representation of the effect of a 90° rotation of the mark, or of the smartphone in the plane of the mark 1 on the substrate 2, and a guiding target 9 on the screen. On the left image the central circle 10 is highly reflective compared to the rest of the mark. On the right image the central circle 10 is not reflective compared to the rest of the mark and resembles the background.

This is explained by the fact that in one orientation the partially reflective platelet-shaped magnetic or magnetizable pigment particles are shining, whereas in the 90° rotated orientation, they are not, which is used as the authentication criterion.

Another embodiment of the invention can make use of a rotation of the smartphone at 90° while keeping it parallel to the mark instead of rotating the mark itself. In this case either the first or the second zone of the mark will be reflecting that can be used for authentication.

The exact location of the mark on the screen preview of the smartphone and the distance of the smartphone to the mark together define precisely the angle at which reflection can be obtained from the platelet-shaped magnetic or magnetizable pigment particles. By providing guiding targets 9 on the smartphone screen preview, the user can easily position the smartphone laterally at the exact location so that the exact angle can be obtained when the viewing distance is also controlled.

The vertical position (viewing distance) can be guided by the size of the target, which should fit the size of the mark at correct distance, or by a second target to be aimed simultaneously at a second mark or a barcode printed besides the magnetically oriented design, or by a written message on the screen prescribing the user to move closer or farther.

This makes the authentication method highly sensitive to the exact platelet-shaped magnetic or magnetizable pigment particles angle and hence allows a good discrimination of potential imitations which would not reproduce the exact orientation.

Figure 10:
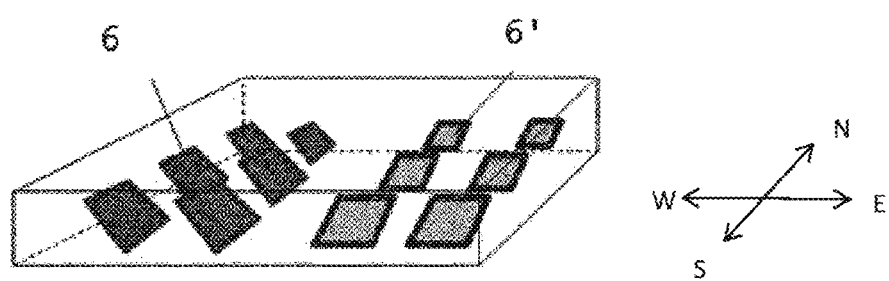
FIG. 10 is a schematic representation of a magnetically induced mark with magnetically oriented partially reflective platelet-shaped magnetic or magnetizable pigment particles in E direction (particles 1) and another class of particles (particles 2) oriented in S direction, at 90° with respect to particles 1.

FIG. 10 shows schematic representation of a mark with magnetically oriented platelet-shaped magnetic or magnetizable pigment particles 6 in E direction and another class of particles 6' oriented in S direction, at 90° with respect to particles 6. In a similar manner as for the previous embodiments a sequence of images can be recorded during the rotation of the mark with respect to the smartphone.

Authentication is performed by analyzing reflected intensity on the first and second zones of the mark in the two images acquired at the two precise positions of the smartphone, thus confirming the orientation angles. In addition, a sequence of images can be acquired during the movement of the smartphone between the two positions in a direction parallel to a plane layer of the mark. Then the intensity from the two different zones with platelet-shaped magnetic or magnetizable pigment particles oriented in either direction is extracted and recorded as a function of the position. Two intensity profiles are obtained which can be analyzed in a similar way as described in FIG. 11 and/or FIGS. 12 and 13.

Figure 11:
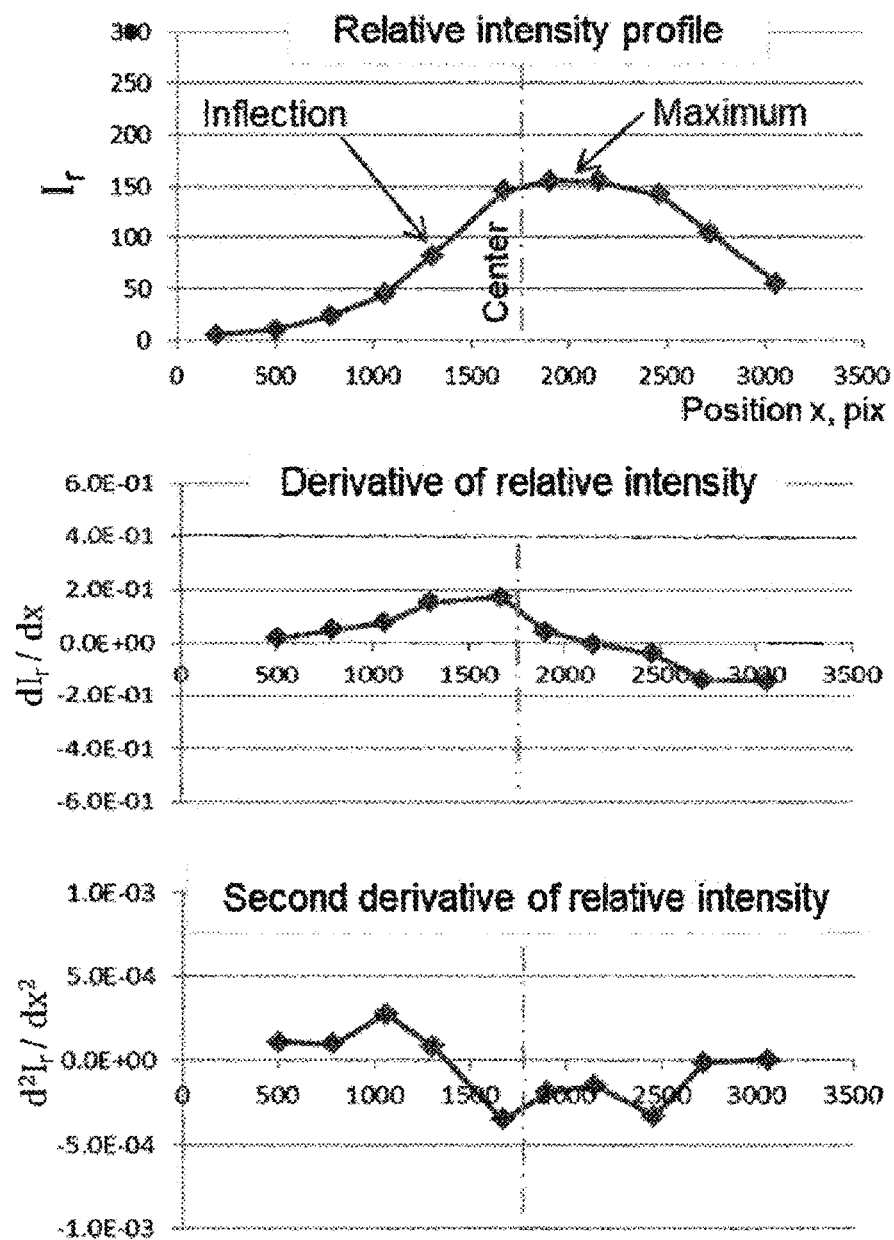
FIG. 11 is a graphical representation of an intensity profile, its first derivative and second derivative vs the position.

In this regard, FIG. 11 shows a graphical representation of intensity profile, its first derivative and second derivative vs the position. First derivative amplitude provides the rate of intensity change and the position of the zero, gives the position of the intensity maximum. The second derivative shows that the intensity profile has two inflection points (inversion).

Figure 12:
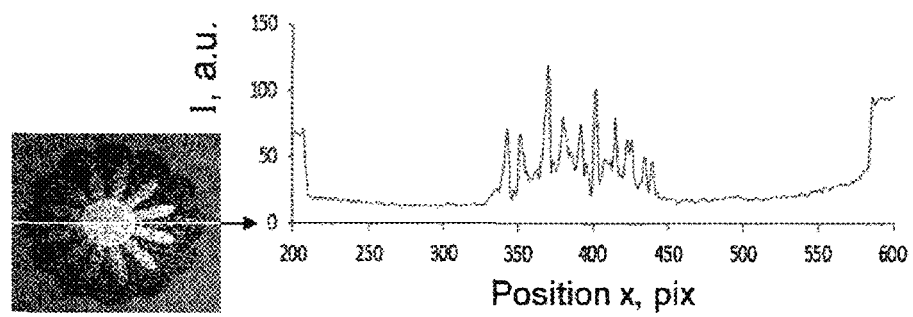
FIG. 12 is a graphical representation of an intensity cross-section of the magnetically induced mark at one specific position in respect to the smartphone showing individual partially reflective platelet-shaped magnetic or magnetizable pigment particles reflections.

FIG. 12 provides a graphical representation of an intensity cross-section of the mark at one specific position in respect to the smartphone showing individual platelet-shaped magnetic or magnetizable pigment particles reflections and high variance of the intensity.

Figure 13:
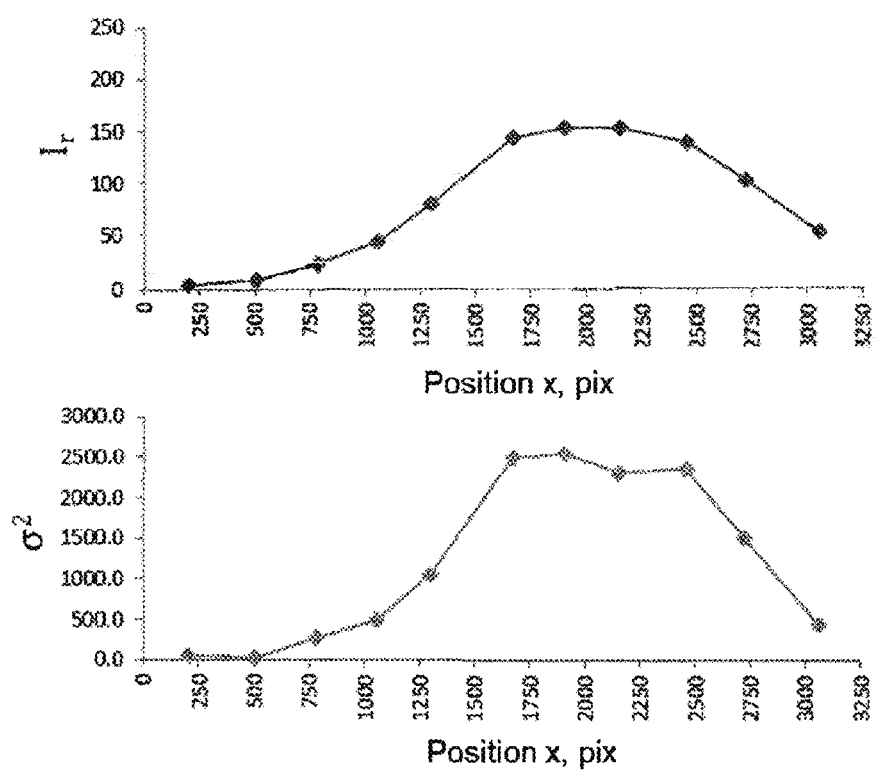
FIG. 13 is a graphical representation of a profiles of the relative intensity and of the variance of the intensity as function of position of the magnetically induced mark in the set of images showing similar behavior of relative intensity and variance.

FIG. 13 shows profiles of the relative intensity and of the variance of the intensity as function of position of magnetically induced mark in the set of images showing similar behavior of relative intensity and variance.

In a similar embodiment, a video sequence can be acquired during a controlled lateral movement of the smartphone in the plane parallel to the mark. This movement can be guided by augmented reality, where a moving target is displayed on the smartphone display and the user is encouraged to move the phone while maintaining the mark within the target. In this way, the rate of intensity change of the magnetically oriented shining platelet-shaped magnetic or magnetizable pigment particles as a function of the angle of view (calculated from the position of the mark on the screen of the smartphone and the smartphone distance to the mark) can be extracted from the video sequence. This rate of intensity change is a strong authentication parameter, since it is very sensitive to the exact angle at which the platelet-shaped magnetic or magnetizable pigment particles are oriented. Rate of intensity change can be obtained from the first derivative of the profile as illustrated in FIG. 11. The second derivative can also be used as a strong authentication parameter, by allowing to determine the position of the inflection points in the profile. State of the art magnetic orientation can provide angular position of the platelet-shaped magnetic or magnetizable pigment particles down to within +/−2 degrees. Even if a counterfeiter could produce a mark with oriented platelet-shaped magnetic or magnetizable pigment particles, it is not likely that the exact angle of orientation could be obtained and the counterfeited mark can then be detected as fake by this method with high accuracy.

Figure 14:
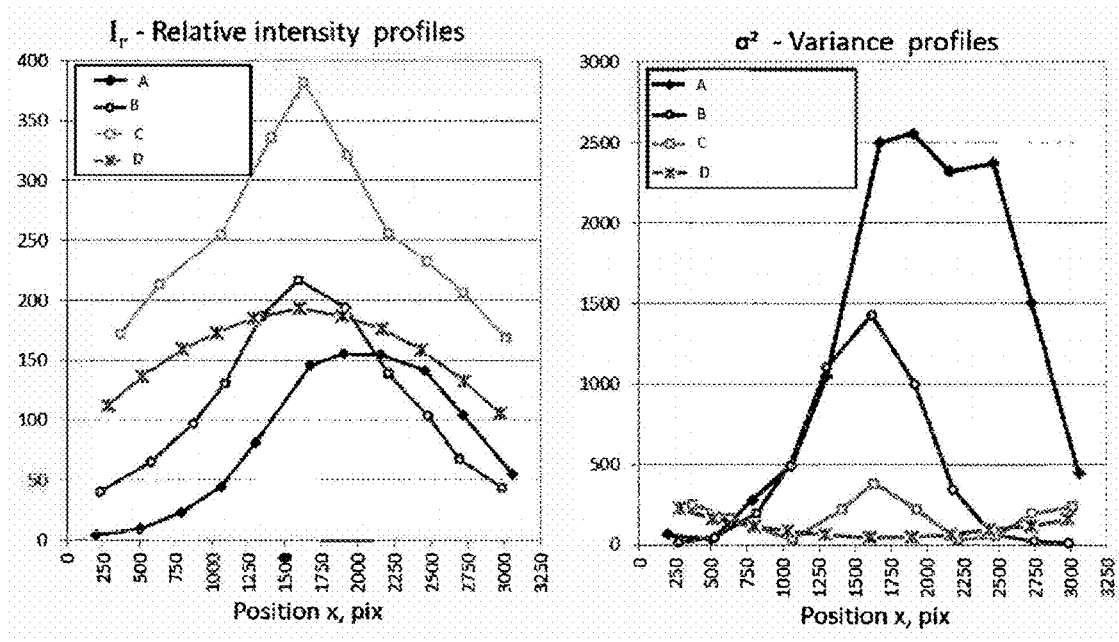
FIG. 14 is a graphical representation of the intensity profiles of various marks. The magnetically induced mark profile clearly shows a significant difference with other marks by its asymmetry with respect to the axis. Relative intensity profile A relates to the magnetically induced mark, relative intensity profile B is a colorshifting pattern made of non-magnetic colorshifting platelet-shaped pigment particles, relative intensity profile C is a pattern made of an ink comprising silver metal particles, and the intensity profile D relates to a mere paper.
Figure 14:
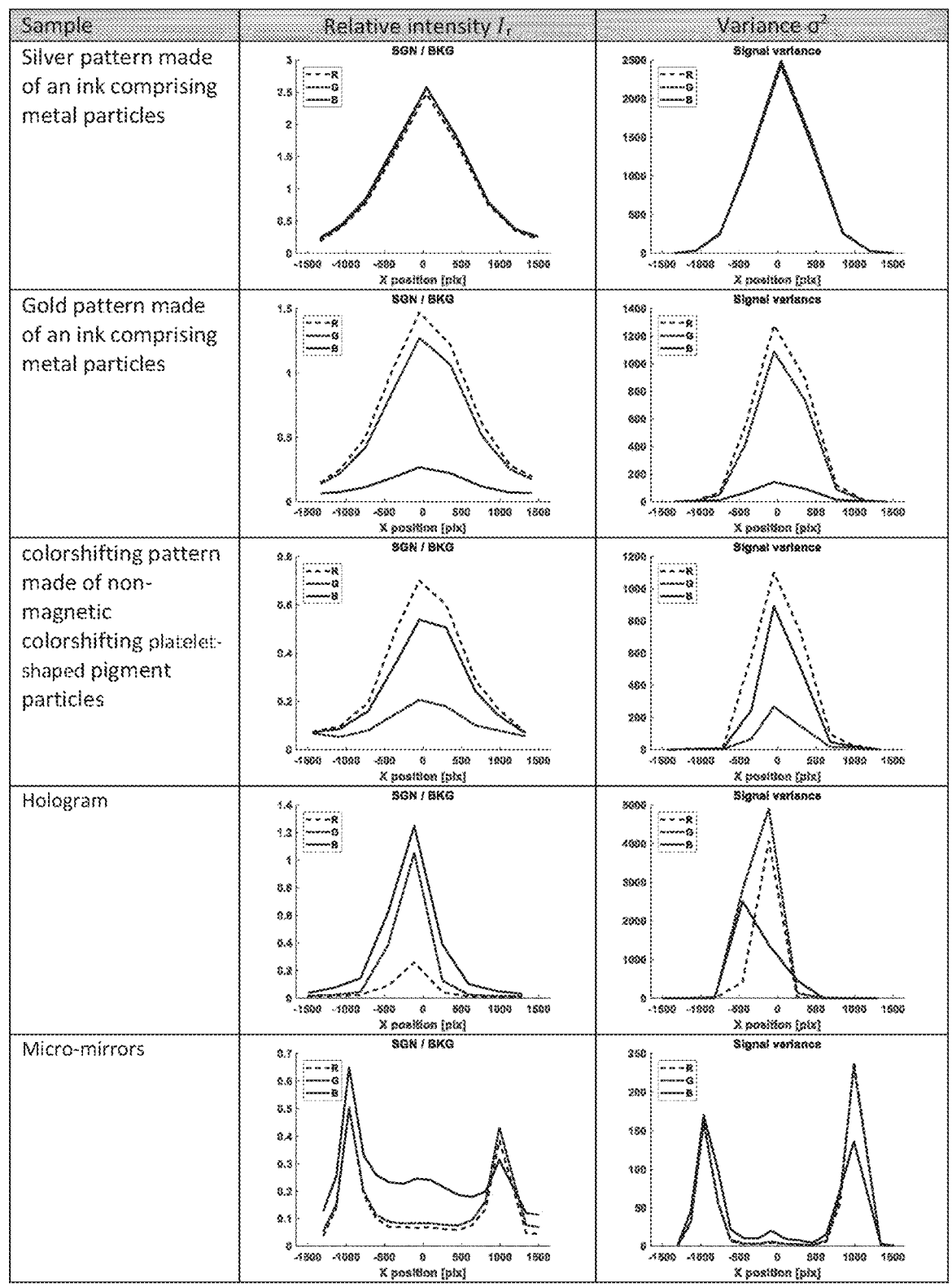
Figure 15:
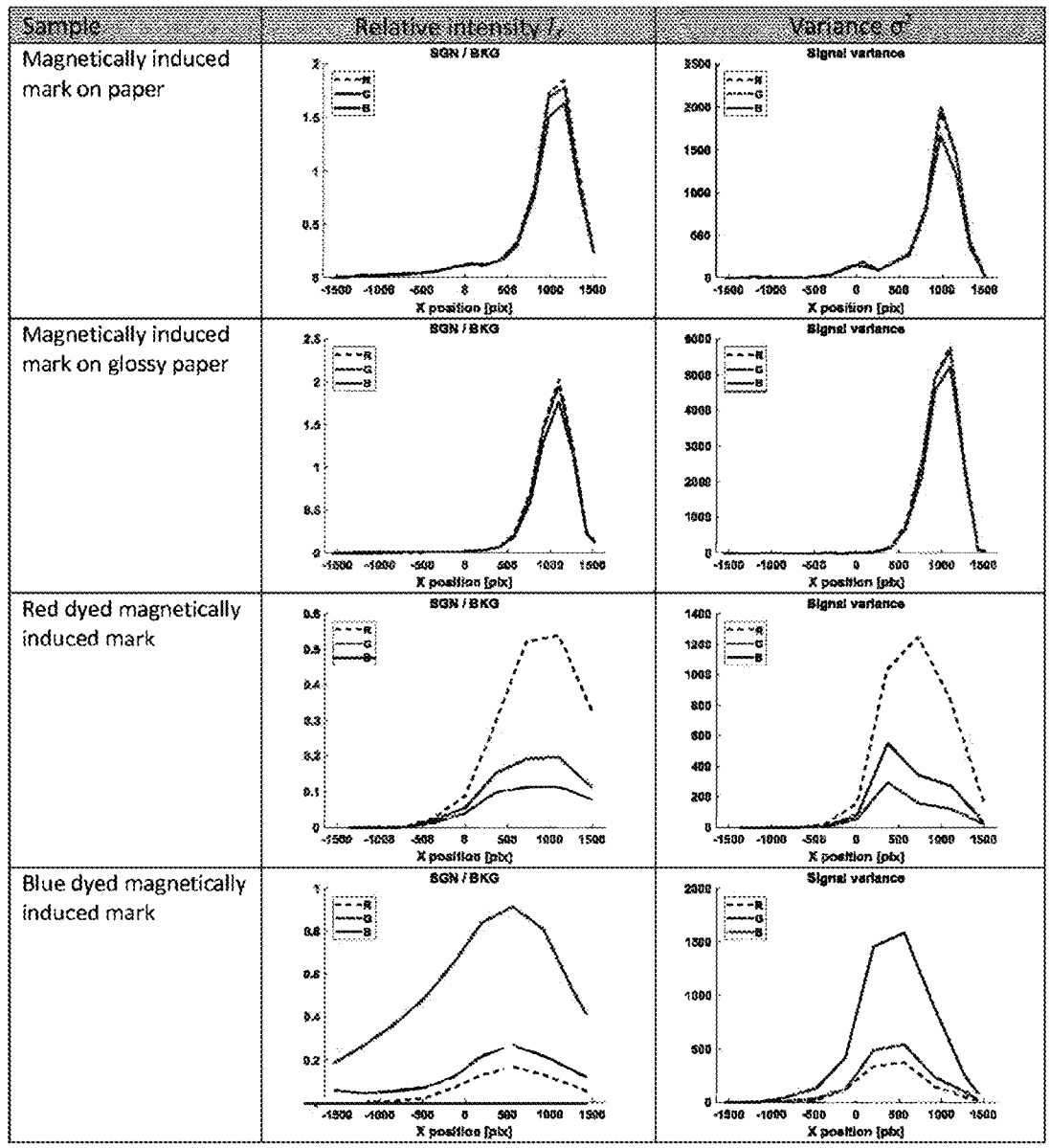
FIG. 15 illustrates examples of relative intensity and variance profiles for various types of marks containing partially reflective platelet-shaped magnetic or magnetizable pigment particles, including magnetically induced marks, holograms and micro-mirrors.

It is also possible to use a video sequence to obtain a relative intensity as function of angle of illumination of the mark that corresponds to position of the mark on the screen during a controlled lateral movement of the phone and in addition to obtain the variance of the pixel intensity within the mark. Both profiles of relative intensity and variance are dependent on the orientation of the platelet-shaped magnetic or magnetizable pigment particles in a magnetically induced mark. FIG. 14 and FIG. 15 show examples of relative intensity profiles and variance profiles for various marks. The examples include marks with inks containing non-oriented and non-magnetic platelet-shaped magnetic or magnetizable pigment particles, magnetically induced marks and finally marks with holograms and micro mirrors as described above. In FIG. 15 the left figures show relative intensity profiles (average intensity of the observed secure mark relative to the e.g. average intensity of a reference paper zone), and the right figures show profiles of the variance of the intensity over the pixels of the image that include the mark.

It is possible to see that marks with non-oriented platelet-shaped magnetic or magnetizable pigment particles have relative intensity profiles as well as variance profiles that are centered and symmetrical. Contrary to these examples the magnetically induced mark described herein show profiles with strong skew. The intensity and variance peaks are shifted to one side of the screen due to orientation of the platelet-shaped magnetic or magnetizable pigment particles contained in the security ink. Examples with holograms show significant difference in the peak positions of the profiles for the three-color channels which is not the case for any of the magnetically induced marks. Finally, micro mirrors-based marks differ from the magnetically induced marks by very low variance and off-peak high intensity, even if the peak positions could resemble these of MOI marks.

This demonstrates that the proposed method allows to differentiate accurately the different types of angular dependent marks, and even to infer the angle of orientation of the platelet-shaped magnetic or magnetizable pigment particles or embossed structure, or micro-mirror. This is a clear demonstration of the advantage over the methods described in the prior art that capture images at only two angular positions.

The measurements shown in FIG. 15 are taken with a camera of a smartphone Samsung S3 fixed at 80 mm from a sample of interest moved parallel to the smartphone within the field-of-view of the smartphone. The camera is set to macro auto focus, fixed white balance, ISO setting and the sequence of pictures used for the examples is taken manually. A video sequence can be used together with function to adjust focus and exposure on object of interest using object tracking function.

Each zone (patch) of interest, either a zone (patch) with a security mark named signal zone (patch) or a paper zone (patch) named a background zone (or background patch) is found with respect to a QR code or other suitable geometrical mark on the label. The positions on smartphone screen of the signal and background zones (patches) are calculated including centers and areas with pixels containing these zones (patches). An average intensity and variance of all pixels within the zones (patches) is calculated for all color channels (e.g. R, G, or B).

A relative intensity for each position of the signal and background zones (patches) is calculated using the ratio of the average pixel intensity in the signal zones (patches) to the average pixel intensity in the background zones (patches) and this is done for all color channels. The average pixel intensity for the background zone (patch) is calculated always for the color channel where the background zone (patch) has maximum intensity to assure that the reference is using signal form channel where the paper has maximum reflectance.

Using a reference to calculate the relative intensity makes it possible to use the smartphone camera with automated setting of the exposure time.

Further embodiments may comprise authentication algorithms based on classifier or neural network-based machine learning which are able to distinguish authentic intensity profiles (or other measured or extracted features such as variance profile or image entropy, etc.) from the ones that are not authentic. As an example, the authentication of a mark can be accomplished using machine learning. This operation then comprises the three following steps of feature extraction, model training and selection, and prediction. Regarding the step of feature extraction, the imager returns a series of RGB images $I(\theta)$, where $\theta_{min} \leq \theta \leq \theta_{max}$ is the scanning angle with respect to the normal to the mark. If necessary, only a Region of Interest (RoI) around the mark may be conserved by cropping the images. These images can be linearized and converted to gray scale (as described in R. C. Gonzalez, T. E. Woods, "Digital Image Processing", Fourth Edition, Pearsons, 2017). However, separate processing of the color channels is also possible.

For each image, one or several metric functions $f(\theta)$ are calculated. A thorough description of image metrics applied to images can be found in the above-mentioned book of R. C. Gonzales and T. E. Woods. Metrics can either be computed on the image intensity directly or on a transform, such as the Discrete Fourier Transform (DFT) or the Discrete Wavelet Transform (DWT). Among the useful metrics that can be used, we find the mean, the standard deviation and the entropy. Depending on the metric used, we may need to scale it by the average intensity of a reference adjacent RoI (this operation allows compensating for the variable exposure times of the imager and for any variations in the irradiation of the mark).

For all measurements to have the same scale, metrics must be estimated on a uniform sampling grid of angles. These angles must be symmetric about the normal to the sample, for example $\theta=[-20°, -18°, \ldots, 0, \ldots, +18°, +20°]$. We can denote this uniform grid as $\theta=[\theta_0\ \theta_1\ \ldots\ \theta_{D-1}]$, where D is the number of angles. Here, for example D=21. In practice, scanning at uniformly-separated angles may not always be possible and interpolation of the metrics may have to be performed. At the end of the scanning procedure, we obtain the feature vector $x^T=[f(\theta_0)\ f(\theta_1)\ \ldots\ f(\theta_{D-1})]=[x_0\ x_1\ \ldots\ x_{D-1}]$. By further performing N scans on different marks to account for their variability, we build the data set $X^T=[x_0\ \ldots\ x_{N-1}]$, with size D×N.

Regarding the step of model training and selection, general machine learning techniques for classification and detection are described in C. M. Bishop, "Pattern Recognition and Machine Learning", Springer, 2009. Here, the authentication problem reduces to distinguishing genuine feature vectors from fakes or attacks. However, while genuine feature vectors are known and available, the others are either unknown or rare. Thus, directly training a two-class classifier is infeasible. As described in O. Mazhelis, "One-Class Classifiers: A Review and Analysis of Suitability in the Context of Mobile-Masquerader Detection," South African Computer Journal, col. 36, pp. 29-48, 2006, authentication can be shown to be equivalent to one-class classification. In this scenario, classifier models only rely on genuine feature vectors to learn their parameters and decision boundaries. Among these, Support Vector Data Description (SVDD), v-Support Vector Classification (v-SVC), Gaussian Mixture Models (GMM), and deep-learning models such as Autoencoders are of practical interest. The selection of a model is dictated by its performance during training and is also constrained by its complexity. At equivalent performance, simpler models are preferred. Prior to training the model, the data set X is pre-processed as shown in the figure below and the following steps are carried:

Sample cleanup. Defective samples such as those saturated or with missing features are discarded.

Sample normalization. Feature vectors are normalized to unit energy.

Feature standardization. Feature mean $\mu(\theta_d)$ and feature standard deviation $\sigma(\theta_d)$ are estimated and removed feature-wise.

Sample detrending. Low-order polynomial trends of fixed order p are estimated on each sample and removed.

Feature reduction. Inter-feature correlations are removed, and the dimensionality of the problem is reduced. Here, for example the reduction can be from D=21 to K=3–5. Lower dimensionality optimization problems converge faster and allow for easier inspection. This step is accomplished through Principal Component Analysis (PCA) (see the book of C. M. Bishop, "Pattern Recognition and Machine Learning", Springer, 2009) that produces a vector subspace $V=[v_0\ \ldots\ v_{K-1}]$, with size D×K. After PCA, we project the data set X onto subspace V, which results in the reduced-feature data set $X'^T=[x'_0\ \ldots\ x'_{N-1}]$, with size K×N. This data set is used for learning the parameters $\Theta$ of the candidate one-class classification models. Finally, the best candidate is retained for prediction.

Regarding the step of prediction, it performs on a data set the operations of data cleanup, sample normalization, feature standardization, detrending, subspace projection, computing of a model decision function. Finally, after feature reduction by subspace projection, the decision function of the classifier with learned parameters is computed (see also I. GoodFellow, Y. Bengio, A. Courville, "Deep Learning", MIT Press, 2016).

Even further embodiments may comprise a perspective rectification to correct imperfect or varying alignment of the imager with the plane of the mark. In addition, a spatial profile stretching or compression due to camera to mark distance variations can also be corrected by extracting the dimensions of a reference mark contour or barcode in the images.

Figure 16:
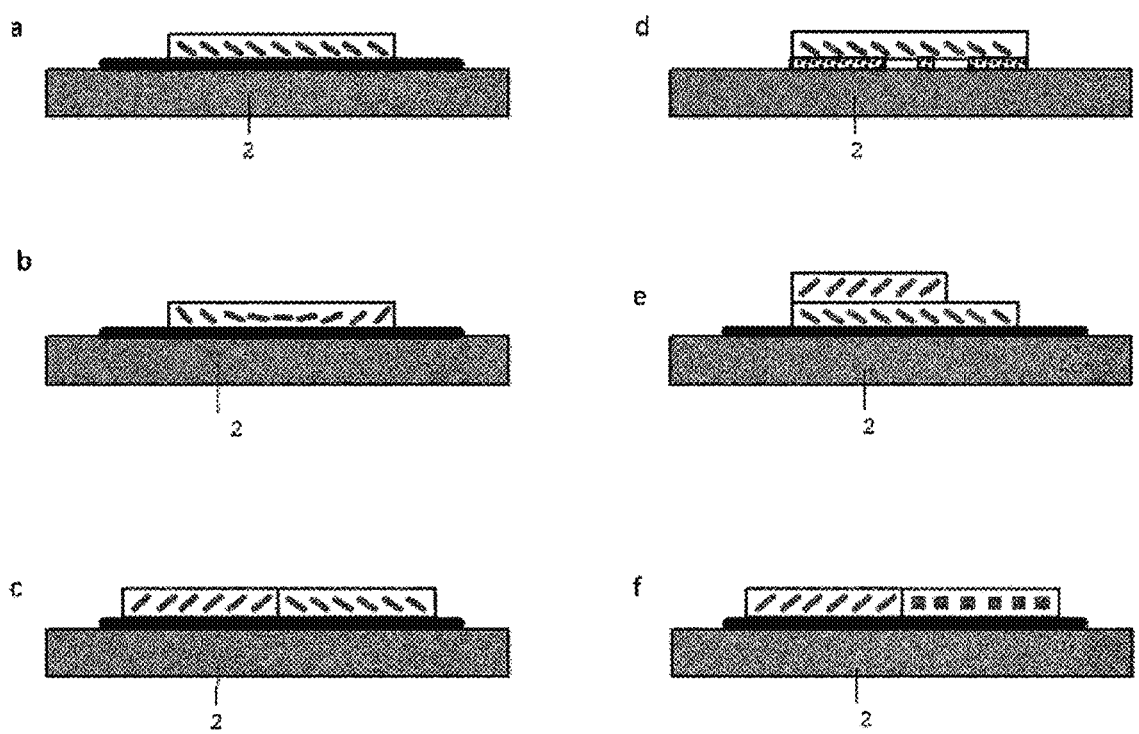
FIG. 16 illustrates various embodiments of the magnetically induced marks.

FIG. 16 illustrates various embodiments of the magnetically induced marks: a) an orientation pattern where all the pigment particles are co-parallel (referred as Venetian blind effect described hereabove); b) "rolling-bar effect", where the pigment particles's angle progressively increases from the mark center to the edge; c) "flip-flop effect", where one area of the mark has partially reflective platelet-shaped magnetic or magnetizable pigment particles co-parallel with one angle, and another part of the mark has pigment particles co-parallel with a different angle; d) "hide and reveal" (referred as Venetian blind effect described hereabove) where a background image or design is printed below the magnetically induced marks and is either hidden by the platelet-shaped magnetic or magnetizable pigment particles for a given viewing angle or revealed for another viewing angle; e) "flip-flop effect" superimposed where two different designs which with co-parallel platelet-shaped magnetic or magnetizable pigment particles are superimposed; f) "rotation" pattern where two zones, each with co-parallel platelet-shaped magnetic or magnetizable pigment particles having orientation tilted by 90° from one to another.

In an embodiment, a geometrical reference pattern in the form of an encoded mark such as an encoded alphanumeric data, one-dimensional barcode, two-dimensional barcode, QR-code or data matrix may at least partially overlap the magnetically induced mark. This, in addition, allows identification of the mark for traceability purposes for example.

Figure 17:
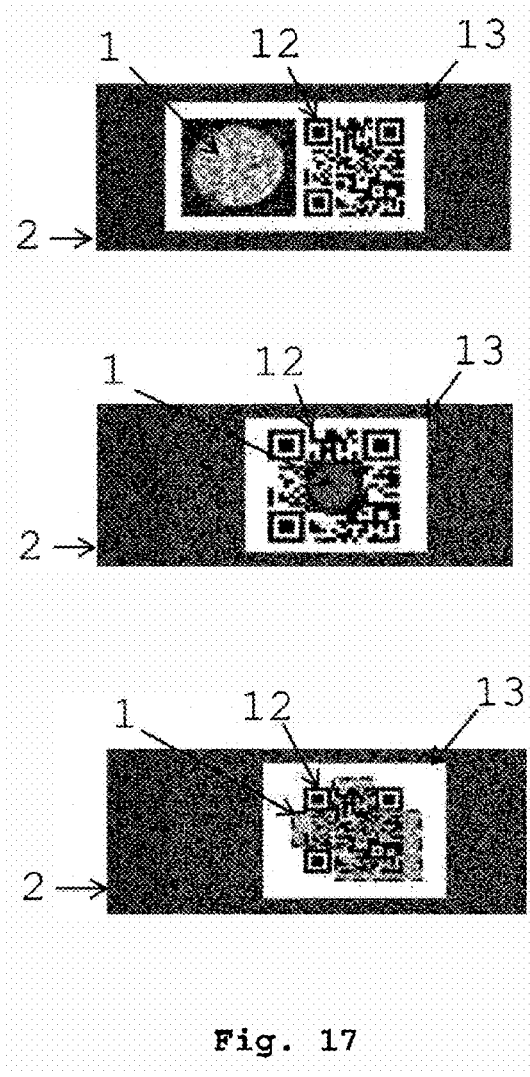
FIG. 17 illustrates various features integrating a magnetically induced mark with a QR code.

FIG. 17 illustrates exemplary various mark designs integrating a magnetically induced mark 1 with a QR code 12 within the background zone (background patch) 13, wherein the magnetically induced mark 1 is close to QR code 12, or wherein the magnetically induced mark 1 is inside QR code 12 or wherein the magnetically induced mark 1 is over a static QR code 12. The QR code 12 could either be static or dynamic (different for every mark 1) depending on the application. The QR code 12 is used to locate efficiently the mark and determine the magnification and allows to extract the position in the field of view of the magnetically induced mark during the sliding movement of the smartphone.

In this case, the QR code 12 is read at position where the magnetically induced mark does not reflect to have enough contrast not altered from magnetically induced mark back-reflection, and the magnetically induced mark profile is measured and analyzed over the black modules of the QR code to have maximum contrast between the positions where the platelet-shaped magnetic or magnetizable pigment particles are oriented to reflect back or not.

Preferably, the following method to measure the relative intensity of the magnetically induced mark from an image that is part of a video sequence may be used:

determining the center of the reference pattern (symbol) in the image with index i;

calculating the position of the magnetically induced mark zone in respect to the reference pattern (symbol);

measuring the average intensity $I_i$ of the magnetically induced mark zone defined as average of intensity of all pixels within the magnetically induced mark zone;

calculating the position of the reflectivity reference zone referred to as background zone—BKG zone;

measuring the average intensity $I_{BKG\_i}$ of the BKG zone;

calculating the relative intensity of the magnetically induced mark zone $I_i = I_i / I_{BKG\_i}$ for all n images with index i=1 . . . n from the video.

Using the geometrical reference pattern with pre-known reflectivity (i.e. QR code quiet zone) which is placed in the vicinity of the magnetically induced mark zone to measure the relative magnetically induced mark patch intensity may further reduce sensitivity to variable ambient illumination.

The present invention provides an improved, accurate and reliable technical solution that is robust against ambient light perturbations, does not rely on high resolution printing or on complex movement of the smartphone and avoids a difficult to control and non-intuitive tilted or azimuthal position or rotation movement.

In fact, the present invention allows an easy to control movement (i.e. parallel to the substrate) having a good immunity to ambient light variability due to a light source, preferably a smartphone flash, which dominates ambient light in most conditions. Operating at close distance with the smartphone positioned parallel to the substrate further reduces external light pollution by shadowing the region of interest. The control for keeping the phone in a given plane could be easily implemented by using, for example, the smartphone's gyroscope. It could also be measured by the size in the image and geometrical deformation (e.g. perspective) of the observed label, mark or QR code. This is a key advantage of the invention and also a substantial improvement compared to the prior art.

Accordingly, the present invention does neither rely on high resolution printing nor on complex movement of the smartphone and makes use of the smartphone internal LED flash light which increases its immunity to external (ambient) light conditions. Moreover, because of the precise and low variance orientation of the platelet-shaped magnetic or magnetizable pigment particles (below +/−2°), the invention is highly discriminating against imitations and selective against other angular dependent reflective marks.

Another advantage of the invention with respect to prior art is provided by the detailed information obtained from the intensity profile, which offers an enhanced security level in the authentication. For example, the rate of intensity change increase and drop is directly related to the homogeneity of platelet-shaped magnetic or magnetizable pigment particles' orientation, which is one of the most challenging features to obtain during the printing process and hence the most difficult to forge. Moreover, the angle of platelet-shaped magnetic or magnetizable pigment particles orientation can be inferred from the angular reflection profile, provided that a scale reference is present in the image (such as a QR-code or any machine-readable code of known dimensions) and the parameters of the camera are well known to calculate the observation angle.

The above disclosed subject matter is to be considered illustrative, and not restrictive, and serves to provide a better understanding of the invention defined by the independent claims.

The invention claimed is:

1. A method of authenticating a magnetically induced mark applied on a substrate and comprising a zone with a plane layer of a material including magnetically oriented partially reflective platelet-shaped magnetic or magnetizable pigment particles, with a portable device equipped with a light source operable to deliver visible light, an imager, a processor and a memory, wherein the zone of the magnetically induced mark comprises a first zone including magnetically oriented partially reflective platelet-shaped magnetic or magnetizable pigment particles, which are tilted at a first angle to a first direction, the method comprising:

disposing the imager of the portable device facing the zone of the magnetically induced mark;

illuminating the first zone of the magnetically induced mark with the light source and taking a plurality of digital images of the illuminated first zone with the imager being for each different digital image at a corresponding distinct viewing angle θ with respect to said first zone, by moving the imager above the magnetically induced mark in said first direction of the orientation of the magnetic or magnetizable pigment particles and parallel to the plane layer;

for each digital image of the illuminated first zone, calculating, with the processor, a corresponding average intensity I of the light reflected by the partially reflective platelet-shaped magnetic or magnetizable pigment particles and collected by the imager at corresponding viewing angle θ;

storing the calculated average intensities of the reflected light and corresponding viewing angles to obtain a reflected light intensity curve I(θ);

comparing the stored reflected light intensity curve I(θ) with a stored reference reflected light intensity curve $I_{ref}(θ)$ for magnetically induced mark, and determining whether the magnetically induced mark is genuine based on a result of the comparison.

2. The method according to claim 1, further comprising calculating a rate of change of the reflected light intensity curve I(θ) to determine an angular value and corresponding intensity peak value of the curve;

comparing the calculated angular value and the intensity peak value with a stored reference angular value and intensity peak value for said magnetically induced mark, respectively, wherein determining whether the magnetically induced mark is genuine is further based on a result of said comparison.

3. The method according to claim 1, further comprising calculating a variance of the reflected light intensity over said zone of the magnetically induced mark from the acquired digital images;

comparing the calculated variance with a reference value of the variance for said magnetically induced mark, wherein determining whether the magnetically induced mark is genuine is further based on a result of said comparison.

4. The method according to claim 1, further comprising reading a geometrical reference pattern, the geometrical reference pattern at least partially overlapping the zone of the magnetically induced mark and being in the form of an encoded mark selected from encoded alphanumeric data, one-dimensional barcode, two-dimensional barcode, QR-code or datamatrix.

5. The method according to claim 1, wherein the zone of the magnetically induced mark comprises a second zone with partially reflective platelet-shaped magnetic or magnetizable pigment particles tilted at a second angle to a second direction, different from the first direction, and the method further comprises:

illuminating the second zone of the magnetically induced mark with the light source and taking a plurality of digital images of the illuminated second zone with the imager being for each different digital image at a corresponding distinct viewing angle θ with respect to said second zone, by moving the imager above the magnetically induced mark in said second direction of the orientation of the magnetic or magnetizable pigment particles and parallel to the plane layer;

for each digital image of the illuminated second zone, calculating, with the processor, a corresponding average intensity I of the light reflected by the partially reflective platelet-shaped magnetic or magnetizable pigment particles and collected by the imager at corresponding viewing angle θ, storing the calculated average intensities of the reflected light and corresponding viewing angles to obtain a reflected light intensity curve I(θ), and comparing the stored reflected light intensity curve I(θ) with a stored reference reflected light intensity curve $I_{ref}(θ)$ for magnetically induced mark, wherein determining whether the magnetically induced mark is genuine is further based on a result of said comparison.

6. The method according to claim 1, wherein the portable device is a smartphone or tablet.

7. A non-transitory computer-readable medium comprising computer code parts executable by a processor to cause a portable device equipped with a light source operable to deliver visible light and an imager, to perform the method of claim 1.

* * * * *